United States Patent
Altunbasak et al.

(10) Patent No.: US 7,215,831 B2
(45) Date of Patent: May 8, 2007

(54) VIDEO ENHANCEMENT USING MULTIPLE FRAME TECHNIQUES

(75) Inventors: Yucel Altunbasak, Norcross, GA (US); Russell Mersereau, Atlanta, GA (US); Bahadir Kursat Gunturk, Atlanta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 688 days.

(21) Appl. No.: 10/133,135

(22) Filed: Apr. 26, 2002

(65) Prior Publication Data

US 2003/0016884 A1     Jan. 23, 2003

Related U.S. Application Data

(60) Provisional application No. 60/286,455, filed on Apr. 26, 2001.

(51) Int. Cl.
*G06K 9/32* (2006.01)
(52) U.S. Cl. .................. 382/299; 375/240; 375/241; 382/300
(58) Field of Classification Search .................. 382/299
See application file for complete search history.

(56) References Cited

U.S. PATENT DOCUMENTS

| | | | |
|---|---|---|---|
| 5,696,848 A * | 12/1997 | Patti et al. ................. 382/254 |
| 5,754,697 A | 5/1998 | Fu et al. .................... 382/232 |
| 5,781,196 A | 7/1998 | Streater .................... 345/428 |
| 6,208,347 B1 | 3/2001 | Migdal et al. ............. 345/419 |
| 6,304,682 B1 | 10/2001 | Patti ......................... 382/299 |
| 2002/0048413 A1* | 4/2002 | Kusunoki ................. 382/282 |
| 2003/0189983 A1* | 10/2003 | Hong .................... 375/240.27 |

FOREIGN PATENT DOCUMENTS

| | | | |
|---|---|---|---|
| EP | 731600 A2 * | 9/1996 |
| EP | 892543 A2 * | 1/1999 |
| EP | 998114 A2 * | 5/2000 |
| EP | 998122 A2 * | 5/2000 |

OTHER PUBLICATIONS

Elad, M., Feuer, A., "Restoration of a Single Superresolution Image from Several Blurred, Noisy and Undersampled Measured Images", IEEE Transactions on Image Processing, vol. 6, No. 2, Dec. 1997.*

(Continued)

*Primary Examiner*—Jingge Wu
*Assistant Examiner*—Sath V. Perungavoor
(74) *Attorney, Agent, or Firm*—Thomas, Kayden, Horstemeyer & Risley, LLP.

(57) ABSTRACT

A system is provided for that improves video quality and resolution. The system include a processor configured with logic to estimate an image from at least one observed image to produce an estimated image, the observed image having a lower spatial resolution than the estimated image. The processor is further configured with logic to simulate steps of an imaging process and compression process and update the estimated image with statistical and/or deterministic information if further optimization is needed, otherwise designate the estimated image as a solution.

89 Claims, 13 Drawing Sheets

OTHER PUBLICATIONS

Patti, A.J., Altunbasak, Y., "Super-Resolution Image Estimation for Transform Coded Video with Application to MPEG", Image Processing, 1999. ICIP 99. Proceedings. 1999 International Conference on.*

Altunbasak, et al., "Super-Resolution Still and Video Reconstruction From MPEG-Coded Video" Apr. 2002, pp. 217-226.

Chen, et al., "Extraction of High-Resolution Video Stills from MPEG Image Sequences" 1998, pp. 465-469.

Elad, et al., "Restoration of a Single Superresolution Image from Several Blurred, Noisy, and Undersampled Measured Images" Dec. 1997, pp. 1646-1658.

Elad, "Super-Resolution Reconstruction of Image Sequences". Sep. 1999, pp. 817-834.

Erickson, et al., "MPEG-1 Super-Resolution Decoding for the Analysis of Video Still Images" Apr. 2000.

Patti, et al., "Artifact Reduction for POCS-based Super Resolution with Edge Adaptive Regularization and Higher-Order Interpolants" 1998, pp. 217-221.

Patti, et al., "Super-Resolution Image Estimation for Transform Coded Video with Application to MPEG" 1999, pp. 179-183.

Schultz, et al., "Bayesian Estimation of Subpixel-Resolution Motion Fields and High-Resolution Video Stills" 1997, pp. 62-65.

Segall, et al., "Pre- and Post-Processing Algorithms for Compressed Video Enhancement" 2000, pp. 1369-1373.

Segall, et al., "Bayesian High-Resolution Reconstruction of Low-Resolution Compressed Video" 2001, pp. 25-28.

Segall, et al., "Reconstruction of High-Resolution Image Frames from a Sequence of Low-Resolution and Compressed Observations" 2002, pp. 1701-1704.

Borman, et al., "Super-Resolution from Image Sequences—A Review" 1998.

Lakhani, "Distribution-Based Restoration of DCT Coefficients" Aug. 2000, pp. 819-823.

Lam, et al., "A Mathematical Analysis of the DCT Coefficient Distribution for Images" Oct. 2000, pp. 1661-1666.

Patti, et al., "Artifact Reduction for Set Theoretic Super Resolution Image Reconstruction with Edge Adaptive Constraints and Higher-Order Interpolants" Jan. 2001, pp. 179-186.

Patti, et al., "Superresolution Video Reconstruction with Arbitrary Sampling Lattices and Nonzero Aperture Time" Aug. 1997, pp. 1064-1076.

Schultz, et al., "Extraction of High-Resolution Frames from Video Sequences" Jun. 1996, pp. 996-1011.

Segall, et al., "Enhancement of Compressed Video Using Visual Quality Measurements" 2000, pp. 645-648.

Segall, et al., "A New Constraint for the Regularized Enhancement of Compressed Video" 2001, pp. 1849-1852.

Altunbasak, Yucel, Office of Naval Research grant awarded May 31, 2001 (confidential document), Abstract containing related material and cover page.

* cited by examiner

VIDEO ENHANCEMENT USING MULTIPLE FRAME TECHNIQUES

CROSS-REFERENCE TO RELATED APPLICATION

This application claims priority to copending U.S. Provisional Application entitled, "RESOLUTION ENHANCEMENT AND ARTIFACT REDUCTION FOR MPEG VIDEO," Ser. No. 60/286,455, filed Apr. 26, 2001, which is hereby incorporated in its entirety by reference.

TECHNICAL FIELD

The present invention is generally related to signal processing and, more particularly, to video processing.

BACKGROUND OF THE INVENTION

Visual communications and image processing are technologies that are employed in a wide range of applications. Such applications include the delivery and presentation of video images over various networks such as cable, space (e.g., via satellite) or computer networks, medical imaging, aerial/satellite photography, remote sensing, surveillance systems, forensic science, digital cameras, and high-quality scanning applications, among others.

During the delivery and/or processing of video images, a loss of image quality typically occurs between the original image and the captured image that will be used for display and/or recording. For example, in the process of recording an image, there is a natural loss of resolution caused by the non-zero physical dimensions of the individual sensor elements, the non-zero aperture time, optical blurring, noise, and motion. Further decline in resolution may occur in transporting the image using fewer bits in order to preserve bandwidth.

Techniques have been developed to address some of these problems. For example, multi-frame resolution enhancement (herein referred to as superresolution) techniques have been developed to estimate a high resolution image by combining the nonredundant information that is available in a sequence of low resolution images. However, current techniques are employed under assumptions that are not necessarily valid for many of the applications, and thus a heretofore unaddressed need exists in the industry for solutions to address one or more of these deficiencies and inadequacies.

SUMMARY OF THE INVENTION

The preferred embodiments of the invention include, among other things, system for improving video quality and resolution. The system includes a processor configured with logic to estimate an image from at least one observed image to produce an estimated image, the observed image having a lower spatial resolution than the estimated image. The processor is further configured with logic to simulate steps of an imaging process and compression process and update the estimated image with statistical and/or deterministic information if further optimization is needed, otherwise designate the estimated image as a solution.

The preferred embodiments of the invention can also be described as, among other things, a method for improving video quality and resolution. The method can generally be described as including the following steps: estimating an image from at least one observed image to produce an estimated image, the observed image having a lower spatial resolution than the estimated image; simulating steps of an imaging process and compression process and updating the estimated image with statistical and/or deterministic information if further optimization is needed, otherwise designating the estimated image as a solution.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
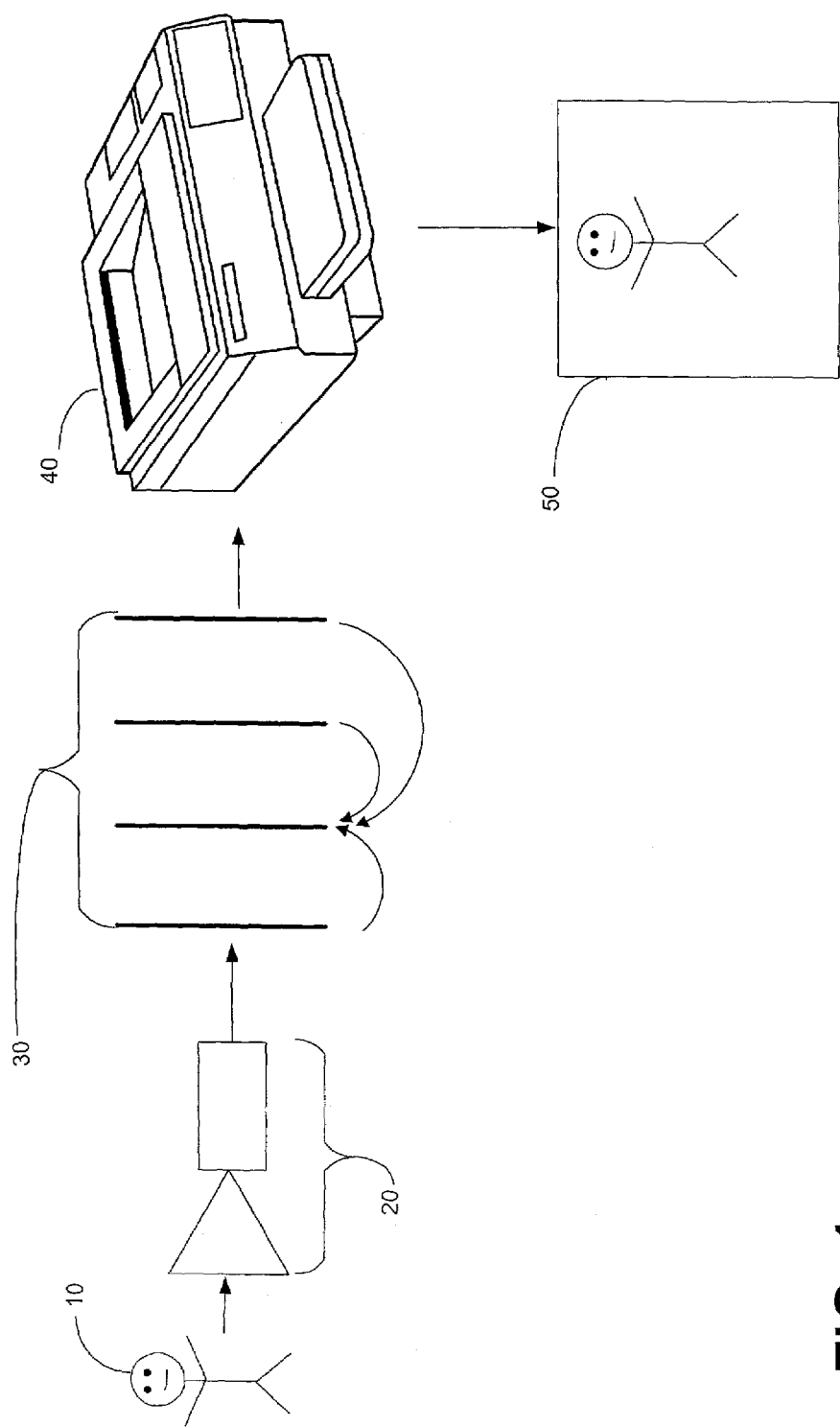
FIG. 1 is a schematic diagram that illustrates the general concept of superresolution as it is applied to imaging systems.

The preferred embodiments include methods for improving the quality and resolution of low resolution images, as well as systems and devices that enable this methodology. The preferred embodiments will first be described in the context of superresolution. Superresolution refers to multiframe reconstruction of low resolution images to improve the spatial resolution and quality of images. In the preferred embodiments, the imaging and compression processes are simulated (e.g., modeled) to determine how an image is affected by the processes. Then, an estimate of a high resolution image is produced by adding sub-sample points to one or more low resolution images (herein referred to as the observed image or images) that have already been processed through the imaging and compression processes. In other words, the one or more observed images, or rather the data representing the respective images (herein referred to as observed image data), are interpolated to create an estimate (in the form of data estimates, such as discrete cosine transform coefficients) of a high resolution image. This estimated data is simulated as being processed through the imaging and compression simulation steps.

One goal of the preferred embodiments is to minimize an error function. To this end, an error function is used that includes an accounting of two factors: (i) the compatibility of the observed image data with the outcome of the estimated data, the outcome resulting from passing the estimated data through the imaging and compression models, and (ii) the likelihood of the estimated data. If the error function returns a small value, then the estimated data was correct and the estimated data is used as the desired high resolution image (after the coefficients are inverse transformed) and processed for presentation. Otherwise, the estimated data is updated, and this updated estimate is simulated as being passed through the models again.

The update takes into consideration factors that include the comparison of the estimated data to the observed image data, and the prior statistics (or the likelihood) of the high resolution image. The error function is a function of the estimated data. When inputting the estimated data to the error function, it returns a value (e.g., a real number). The updating occurs in such a manner that the error function returns a value when the updated estimated data is used. This process is repeated until the error function is small enough. As is described below in further detail, the error function is mathematically formulated and another formula is derived for updating the estimates. The determination of whether the error function is small enough can take many forms including setting a fixed threshold value, setting the number of iterations (i.e., the updating iterations) to a pre-determined number, or evaluating the amount of change in the update (e.g., if the change is less than a predetermined value, stop the iterations), among other forms.

The preferred embodiments also include the aforementioned methodology as applied in superprecision. Superprecision refers to multi-frame gray scale resolution enhancement. Superprecision can be thought of as a generalized version of superresolution, in that superprecision primarily addresses the decrease in bit depth when a high resolution image is bit reduced.

The preferred embodiments of the invention can, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

In the discussion that follows, superresolution is generally described for an example imaging process, followed by some example applications that can incorporate the preferred embodiments of the invention. Then, the preferred embodiments are presented in stages, with no particular order implied, starting with a discussion of the simulation process at a higher level, followed by a low level explanation (via math formulations). Then, the updating process is described in both the discrete cosine transform domain (i.e., frequency domain, or compression domain) and the spatial domain. A description of superprecision follows the updating discussion. Finally, a description of how an example decoder can implement the preferred embodiments is discussed.

FIG. 1 is a schematic diagram that illustrates the general concept of superresolution as it is applied to imaging systems. As stated above, the updating process can be implemented using more than one observed image. As an example, assume a user wants to print a picture from a video sequence. The screen resolution for displaying video is typically 480 lines per frame, where printer quality resolution is typically 600 dots per inch. Thus, produced picture quality would suffer significantly under these resolution discrepancies. One method to improve the resolution is to use a sequence of frames 30 that include the image of the object 10, captured with an image capture device 20, and select one to print from the printing device 40. Typically, the frames 30 are temporally spaced $1/30^{th}$ second apart, and thus movement and image information can be correlated and combined to produce a single image to produce a high resolution image 50. Further information on superresolution generally used in imaging can be found in the patent entitled, "SYSTEM FOR CREATING A HIGH RESOLUTION IMAGE FROM A SEQUENCE OF LOWER RESOLUTION MOTION IMAGES," U.S. Pat. No. 5,696,848, dated Dec. 9, 1997, and herein incorporated by reference.

Although superresolution is described in association with FIG. 1 to improve the resolution of a single selected picture, it is equally applicable to improving video resolution. In the latter application, superresolution must occur for each frame. Thus, a "sliding window" procedure is employed wherein the resolution is improved for the image of every frame by grouping and then overlapping frames. For example, the image of a first frame has a resolution improved by grouping the information of several, e.g., four, nearby frames, then the image of a second frame has a resolution improved by grouping the next several, e.g., four, frames (three of which preferably overlap the ones used for the first frame), etc.

The preferred embodiments of the invention include superresolution and superprecision technology to improve bit depth resolution, as well as spatial resolution, in spatial and frequency domains. Some example implementations that can incorporate, and thus benefit from, the preferred embodiments of the invention are included below. An initial emphasis is placed on compressed video applications due to the popularity of such applications, with the understanding that the preferred embodiments of the invention can equally benefit systems in the uncompressed domain. Examples for compressed video applications include High Definition Television (HDTV), cable or satellite set-top boxes (STBs), Digital Video Disk (DVD) players, and digital cameras, among others. For example, in HDTV applications, the screen resolution is superior to the signal input (which typically occurs over an analog media). One goal is to provide a display resolution that matches the signal quality. The preferred embodiments of the invention can be employed in the HDTV, for example as a digital signal processing (DSP) chip that receives the lower quality video and outputs images with improved resolution.

As for STBs, bandwidth is expensive and, thus, transmission signals are typically sent from headends using compression and other data reduction mechanisms to conserve the bandwidth. Providing improved resolution at the STB enables the low resolution video received at the STB to be improved while conserving bandwidth. DVDs can similarly benefit from the preferred embodiments of the invention, as the current rates of 9.8 megabits per second (Mbps) can incorporate the preferred embodiments again via a DSP chip, as one example, with rates of 15 Mbps readily achievable. Regarding digital cameras, by taking multiple camera shots and incorporating the preferred embodiments, a $150 digital camera can produce pictures having the quality produced using a $1000 camera.

One problem that arises and that is addressed by the preferred embodiments of the invention is the loss of spatial resolution, due primarily to the processing characteristics of imaging systems, such as losses due to low pass filtering and sampling. Even without compression, the observed images lack spatial resolution (e.g., details of the image). When the observed image data undergoes compression, the spatial resolution degrades further. For example, during compression, discrete cosine transform (DCT) coefficients (e.g., the observed image data) are quantized, which is a lossy operation. Consequently, the inverse DCT will not produce the pre-quantized DCT coefficients.

The following discussion generally describes the simulation of imaging and compression processes. One purpose of the simulation process is to get an accurate idea of the source of resolution losses for an acquired image in order to reproduce such effects in the simulation of passing an estimated image through the processes. For example, although the actual image object (for example, a child riding his bike on the street) has infinite resolution, an acquisition device such as a camera provides for finite resolution (e.g., due to a finite number of pixels), and thus the resulting picture taken using the camera will manifest a loss of resolution. The preferred embodiments of the invention include this simulation of the imaging and compression processes and the simulation of the effects of the elements of these processes on an image that is passed through for processing.

Figure 2:
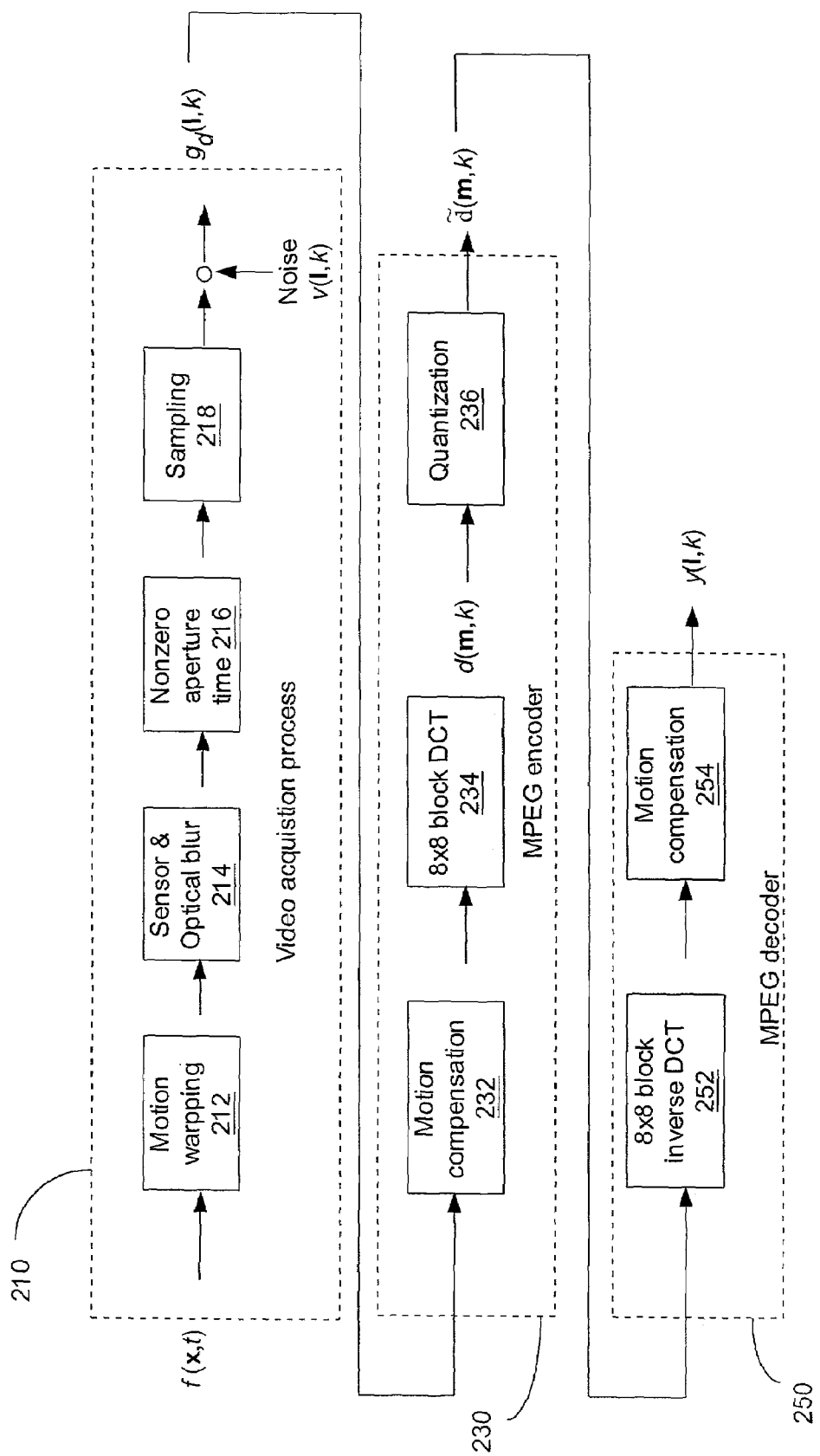
FIG. 2 illustrates the simulation of an example imaging and MPEG compression process that will be used to illustrate DCT domain embodiments, spatial domain embodiments, and superprecision embodiments of the preferred embodiments.

FIG. 2 illustrates the steps included in an example imaging and MPEG compression process. It will be understood by those having ordinary skill in the art that although one video compression standard (MPEG, or Moving Pictures Experts Group) is described, other linear video compression standards can be used. For instance, the preferred embodiments can apply such standards as Joint Photographic Experts Group (JPEG), MPEG 1, 2 and 4, International Telecommunications Union (ITU) standards H261, H262, H263, and H26L, among others. Preferably, the compression standard used will dictate the steps of the compression model. Further information on MPEG can be found in ISO/IEC 13818, which is incorporated by reference. Similarly, the imaging model can be fashioned for the particular camera or device used in the acquisition of the image to best simulate the process. A higher level discussion of the imaging and compression processes is provided, followed by a mathematical representation of the relationships among observed and estimated images subject to these simulated processes. The result of the mathematical representation is a linear set of equations that relates high-resolution images to quantized DCT coefficients of images in low-resolution frames. The set of equations will be used in later sections as a basis for describing the updating process in a DCT domain and a spatial domain.

FIG. 2 includes an imaging model (block 210), a compression model (block 230), and a decoder model (block 250). The imaging model 210 includes a motion warping element 212. The idea behind motion warping is that the sequence of frames need to be related, since the information of the images from these plurality of frames will be combined to ultimately produce a high resolution image. One aspect of relating includes determining how much motion exists between pixels of the image.

The next element includes the sensor and optical blur element 214. Typically in cameras, the lens is a source of optical blur. Further, the sensors include charge-coupled devices (CCDs) which, due to their finite area, also cause optical blur. The non-zero aperture time element 216 relates to the fact that cameras typically have a non-zero open and close time, and thus the resulting motion is also a source of blurring (the magnitude of blurring which depends on, among other things, the quality of the camera and the amount of motion being detected). The sampling element 218 portrays the sampling of intensity values that occur to the CCD. The size of the CCD and the sensor density (e.g., pixel spacing) will influence the amount of diminished resolution. Note that noise is also added to the imaging block 210 to relate the influence of noise on the resultant image resolution. The noise influence is statistically modeled in the preferred embodiments of the invention. An image is produced from the imaging process for further processing by the compression model 230, as is described below.

The mathematical representation of the imaging model is now presented. According to the imaging model, a spatially and temporally continuous high-resolution input signal $f(x, t)$ is affected by sensor and optical blur. Sensor blur is caused by integrating over the finite nonzero sensor cell area, while optical blur is caused by the lens system. The blurred video signal is also integrated over time to capture nonzero time-aperture effects. After sampling on a low-resolution grid, discrete low-resolution frames $g_d(l, k)$ are obtained. Incorporating motion modeling into this video imaging model, the relationship between these signals can be modeled as follows:

$$g_d(l, k) = \int f(x, t_r) h_c(x, t_r; l, k) dx + v(l, k), \quad (1)$$

where $h_c(x, t_r; l, k)$ represents the linear shift-varying (LSV) blur between the continuous high resolution image $f(x, t_r)$ at a reference time $t_r$ and the $k^{th}$ discrete low resolution image. $v(l, k)$ represents the additive noise process. Extending zero-order-hold discretization to higher-order interpolants results in the following formulation for the video imaging process:

$$g_d(l, k) = \sum_n f(n, t_r) h(n, t_r; l, k) + v(l, k), \quad (2)$$

where $h(n, t_r; l, k)$ is the discrete linear shift-varying (LSV) blur mapping between the discrete high resolution image $f(n, t_r)$ at a reference time $t_r$ and the $k^{th}$ discrete low resolution image. The high resolution and low-resolution sampling lattice indices (i.e., pixel coordinates) are $n \equiv (n_1, n_2)$ and $l \equiv (l_1, l_2)$, respectively. The summation is over both $n_1$ and $n_2$ but is represented as a single summation here for simplicity. Note that Equation 2 provides a linear set of equations that relates the high resolution image at time $t_r$ to the low resolution frames $g_d(l, k)$ for different values of k. The blur function $h(n, t_r; l, k)$ is computed separately for each value of k.

Returning to the high level description of the modeling process, the next modeling block shown in FIG. 2 is the compression block 230. In this implementation, the compression of the image is preferably implemented in an MPEG encoder upon receiving the output $g_d(l, k)$ from the imaging process. The first element shown is the motion compensation element 232. Typically in MPEG, the frames implemented include intra-coded (I), predicted (P), and bilateral (B) frames. As is well understood in the art, I frames are independently coded. P frames are used in combination with I frames to produce a residual (information that is different between the I frame and the P frame), such that the residual is coded and not the entire image. B frames are similar to P frames, but are bi-directionally predicted from the I frames (i.e., use the previous and succeeding frames). Each frame is comprised of a 16×16 array of blocks (called macroblocks). Each macroblock is comprised of 8×8 pixel blocks. Each macroblock also includes a motion vector that includes information about translation motion among pixels with respect to different frames.

Following the motion compensation element 232 is an 8×8 DCT element 234. The DCT element 234 portrays a transform that is used to transform the 8×8 pixel blocks into the DCT domain and thus provide a format where redundancy detection is facilitated. Thus, coefficients are produced for the frequency domain, or DCT domain, and these coefficients are quantized at the quantization element 236 and then stored in an MPEG file. The MPEG file is preferably sent to the decoder model 250, where the quantized DCTs from the compression model 230 are inverse transformed at the inverse DCT element 252 and then motion compensated at the motion compensation element 254.

Describing the effects of compression simulation mathematically, the low resolution frame $g_d(l, k)$ is motion compensated (i.e., the prediction frame is computed and subtracted from the original to get the residual image), and the residual is transformed using a series of 8×8 block-DCTs to produce the DCT coefficients $d(m, k)$. The index $m \equiv (m_1, m_2)$ denotes the spatial coordinate in the DCT domain. Defining $\hat{g}(l, k)$ as the prediction frame, and $$g(l, k) \equiv \sum_n f(n, t_r) h(n, t_r; l, k)$$

then:

$$d(m, k) = DCT\{g(l, k) - \hat{g}(l, k) + v(l, k)\} \quad (3)$$

where DCT $\{\cdot\}$ represents the 8×8 block DCT operator. The prediction frame $\hat{g}(l, k)$ is obtained using neighboring frames except for the case of intra-coded frames, where the prediction frame is zero. Denoting G, $\hat{G}$, and V as the block-DCTs of g, $\hat{g}$, and v respectively, Equation 3 can be rewritten as:

$$d(m, k) = G(m, k) - \hat{G}(m, k) + V(m, k) \quad (4)$$

Using the definition of g, G can be written as a function of the high resolution image $f(n, t)$, as shown by the below Equation 5:

$$G(m, k) = \sum_n f(n, t_r) h_{DCT}(n, t_r; m, k) \quad (5)$$

where $h_{DCT}(n, t_r; m, k)$ is the 8×8 block DCT of $h(n, t_r; l, k)$. To be explicit $h_{DCT}(n, t_r; m, k)$ can be written as the below Equation 6:

$$h_{DCT}(n_1, n_2, t_r; m_1, m_2, k) = \sum_{l_1 = 8\lfloor m_1/8 \rfloor}^{8\lfloor m_1/8 \rfloor + 7} \sum_{l_2 = 8\lfloor m_2/8 \rfloor}^{8\lfloor m_2/8 \rfloor + 7} C(m_1 \bmod 8, m_2 \bmod 8; l_1, l_2) h(n_1, n_2, t_r; l_1, l_2, k),$$

where $\lfloor \ \rfloor$ is the floor operator, mod stands for the modulo operator, and C is the 8×8 DCT basis function, given by $$C(m_1, m_2, l_1, l_2) = c_{m1} c_{m2} \cos\left[\frac{(2l_1 + 1)m_1 \pi}{16}\right] \cos\left[\frac{(2l_2 + 1)m_2 \pi}{16}\right], \quad (7)$$

with $c_{m_1}$ and $c_{m_2}$ being the normalization constants:

$$c_{mi} = \begin{cases} \frac{1}{4\sqrt{2}}, & m_i \neq 0 \\ \frac{1}{4}, & m_i \neq 0 \end{cases}, \quad i = 1, 2. \quad (8)$$

The DCT coefficients $d(m, k)$ are then quantized to produce the quantized DCT coefficients $\tilde{d}(m, k)$. The quantization operation is a nonlinear process that will be denoted by the operator $Q\{\cdot\}$:

$$\tilde{d}(m, k) = Q\{d(m, k)\} = Q\{G(m, k) - \hat{G}(m, k) + V(m, k)\}. \quad (9)$$

Equation 9 is an equation that represents the relation between the high resolution image $f(n, t_r)$ and the quantized DCT coefficients $\tilde{d}(m, k)$. Equation 9 will be used below to establish a framework for resolution enhancement, in accordance with the preferred embodiments of the invention. In MPEG compression, quantization is realized by dividing each DCT coefficient by a quantization step size followed by rounding to the nearest integer. The quantization step size is determined by the location of the DCT coefficient, the bit rate, and the macroblock mode. The quantized DCT coefficients $\tilde{d}(m, k)$ and the corresponding step sizes are available at the decoder, i.e., they are either embedded in the compressed bit stream or specified as a part of the coding standard. The quantization takes place in the transform domain. This quantization information can be exploited by using it in the DCT domain (i.e., without reverting back to the spatial domain), or in other embodiments, this information can be exploited by using it in the spatial domain. Both of these implementations will be described below.

Now that a general understanding of the imaging and compression process is realized and the relationships between the observed and estimated images are related mathematically, a higher level recap of what occurs up to the point of updating the estimates can be described in the context of the described models. In the preferred embodiments, observed image data of a low resolution image (i.e., the observed image, again with the understanding that more than one observed image can be used consistent with super-resolution) is interpolated to produce an estimate of a high resolution image. A simulation of the effects of this estimate being processed through the described model blocks of FIG. 2 is implemented to produce simulated DCT coefficients. These simulated DCT coefficients are input into an error function, which in a general sense, compares the observed image coefficients to the simulated DCT coefficients, and evaluates the likelihood of the estimated image. Note that the observed image data can be found in the MPEG bit stream, as would be appreciated by one having ordinary skill in the art.

Now that the modeling is discussed, the comparison and updating process of the preferred embodiments is discussed. The DCT domain embodiments of the preferred embodiments, as described in association with FIGS. 3A–3C and FIGS. 4 and 5, includes providing updates in the DCT domain. The spatial domain embodiments of the preferred embodiments, described in association with FIG. 6, includes updating in the spatial domain after decompressing a simulated image (i.e., an image that results from simulating the effects of the imaging and compression processes on the estimated image). Briefly, as described above, an error function is used, and a goal of the preferred embodiments is to minimize the error function. The error function preferably accounts for the compatibility of the observed image data with the outcome of the estimated data after simulating the processing through the models (i.e., the simulated data), and the likelihood of the estimated data. The determination of when the error function is minimized enough can take many forms, including setting a fixed threshold value, setting the number of iterations (for updating) to a pre-determined number, or evaluating the amount of change in the update (e.g., if the change is less than a predetermined value, stop the iterations), among other forms. If updating is needed for an improved image resolution, the updating preferably includes incorporation of prior statistics of the modeled processes. If updating is not needed, the last estimated image data is the data that will be designated as the high resolution solution.

It is helpful to define a couple of terms initially to understand later what is included as the meaning of an error function. A maximum a posteriori (MAP) solution is represented as follows:

$$\hat{f} = \underset{f}{\operatorname{argmax}}\{p_{d_1,\ldots,d_p|f}(f)p_f(f)\} \quad (10)$$

An objective function to be maximized is represented as follows:

ObjectiveFunction=$p_{d_1,\ldots,d_p|f}(f)p_f(f)$

In these equations, $\hat{f}$ is the estimated image, $p_{d_1,\ldots,d_p|f}(f)$ is the likelihood term that includes statistical information about the quantization and noise processes, and $p_f(f)$ is the likelihood term that favors smoothness (i.e., by penalizing the updates that tend to make the image noisy) of the estimated image. arg max stands for "argument that maximizes" . . . By formulating the terms in the "objective function," an "error function" can be derived. For purposes of the following description, the definition of an "objective function" is as given above, and the "error function" is derived according to the choices of the terms. For example, when the likelihood terms $p_{d_1,\ldots,d_p|f}(f)$ and $p_f(f)$ are exponential functions, the sum of their absolute exponents can be defined as the "error function" to be minimized. In a broad sense, the error function is defined to, among other things, penalize (1) the difference between a simulated image and an observed image, and (2) noisy estimation. Specifically, statistical information about noise, quantization error, and the high resolution image is included to define the error function.

In the preferred embodiments, not only the source statistics, but also various regularizing constraints can be incorporated into the solution. As will be shown, the preferred embodiments of the invention can combine the quantization process and the additive noise in an estimation framework. Using a MAP formulation, the quantized DCT coefficients, $d(m, k)$, the original high resolution frame $f(n, t_r)$, and the block DCT of the additive noise, $V(m, k)$, are all assumed to be random processes. Denoting $p_{f(\underline{n}, t_r)|\underline{d}(\underline{m}, k_1), \ldots, \underline{d}(\underline{m}, k_p)}(\cdot)$ as the conditional probability density function (PDF) with $k_1, \ldots, k_p$ being the frames used in the reconstruction, the MAP estimate $\hat{f}(n, t_r)$ is given by:

$$\hat{f}(n, t_r) = \underset{f(\underline{n},t_r)}{\operatorname{argmax}}\{p_{\underline{d}(\underline{m},k_1),\ldots,\underline{d}(\underline{m},k_p)|f(\underline{n},t_r)}(\cdot)p_{f(\underline{n},t_r)}(\cdot)\}, \forall n, \quad (11)$$

Note that underline notation (in n and m) is used to emphasize that this PDF is the joint PDF, not the PDF at a specific location. The need for this distinction will later become evident.

The conditional PDF $p_{\underline{d}(\underline{m}, k_1), \ldots, \underline{d}(\underline{m}, k_p)}(\cdot)$ and the prior PDF $p_{f(\underline{n}, t_r)}(\cdot)$ will be modeled in order to find the MAP estimate $\hat{f}(n, t_r)$. In the following description, the conditional PDF $p_{\underline{d}(\underline{m}, k_1), \ldots, \underline{d}(\underline{m}, k_p)|f(\underline{n}, t)}(\cdot)(\cdot)$ is derived, which can be used with essentially any image model. The prior PDF handles the statistical information about the high resolution image to ensure that the reconstructed image is not undesirably noisy. On the other hand, the conditional PDF handles the statistical information about the noise and quantization.

Given the frame $f(n, t_r)$, the only random variable on the right-hand side of Equation 9 is the DCT of the additive noise, $V(m, k)$. The statistics of the additive noise process $v(m, k)$ are preferably used to find the PDF of $V(m, k)$. A reasonable assumption for $v(m, k)$ is that of a zero-mean independent, identically distributed (IID) Gaussian process. Under this assumption the PDF of the additive noise at each location $(m, k)$ is:

$$p_{v(m,k)}(x) = \frac{1}{\sqrt{2\pi}\sigma}e^{-x^2/2\sigma^2}, \quad (12)$$

where $\sigma^2$ denotes the noise variance. Note that m is used instead of $\underline{m}$ in Equation 12 to clarify that this is the PDF at a single location, not the joint PDF. The PDF of $V(m, k)$ is also a zero-mean IID Gaussian random variable with the same variance $\sigma^2$. Therefore, $$p_{V(m,k)}(x) = \frac{1}{\sqrt{2\pi}\sigma}e^{-x^2/2\sigma^2}, \quad (13)$$

From Equation 4, it follows that the PDF of d(m, k) is also an IID Gaussian process, but in this case one with a mean G(m, k)–Ĝ(m, k). That is, $$p_{d(m,k)}(x) = \frac{1}{\sqrt{2\pi}\,\sigma} e^{-\frac{(x - G(m,k) + \hat{G}(m,k))^2}{2\sigma^2}} \tag{14}$$

Quantization theory can be used to compute the PDF of the quantized DCT coefficients d̃(m, k). Under some conditions, the PDF of the quantized signal can be computed using a two-step process: first, evaluate the convolution of the input signal PDF and a rectangular pulse (with an area of one and a width equal to the quantization step size), and then multiply the result of this convolution with an impulse train. Thus, $$p_{\tilde{d}(m,k)|f(n,t_r)}(x) = (p_{n(m,k)}(x) * p_{d(m,k)}(x)) \sum_{r=-\infty}^{\infty} \delta(x - r\Delta(m,k)) \tag{15}$$

where $\Delta(m, k)$ is the quantization step size, and $p_{n(m, k)}(x)$ is the rectangular pulse:

$$p_n(x) = \begin{cases} 1/\Delta, & |x| < \Delta/2 \\ 0, & \text{otherwise} \end{cases} \tag{16}$$

Equation 15 is valid under the conditions that the quantizer has a uniform step size, and there is no saturation. The former condition is valid for MPEG as well as many other compression standards. For each DCT coefficient, there is a uniform step size that is determined by the location of the DCT coefficient, and the compression rate of the encoder. The latter condition is also satisfied for all DCT coefficients.

Substituting Equations 14 and 16 into Equation 15 provides the following:

$$p_{\tilde{d}(m,k)|f(n,t_r)}(x) = \left\{ \frac{1}{\sqrt{2\pi}\,\sigma\Delta} \int_{x-\Delta/2}^{x+\Delta/2} e^{-\frac{(u - G + \hat{G})^2}{2\sigma^2}} du \right\} \sum_{r=-\infty}^{\infty} \delta(x - \Delta r) \tag{17}$$

where the dependence on (m, k) is dropped from Δ, G, and Ĝ to simplify the notation. Herein the dependence on (m, k) will not be indicated for simplicity, but with the understanding that Δ, G, and Ĝ are function of (m, k).

Figure 3A:
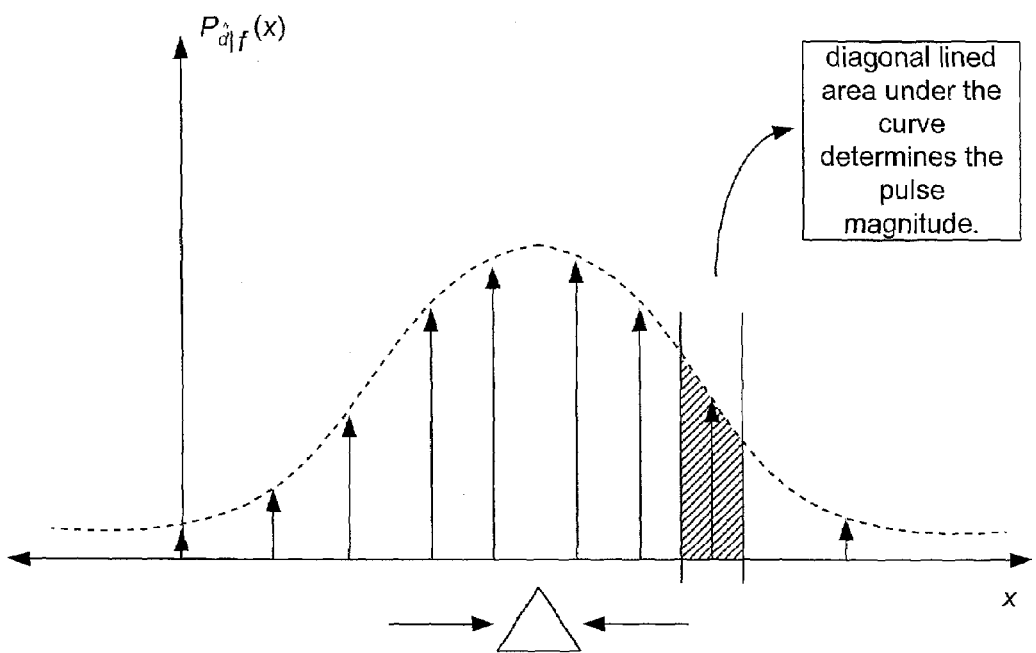
FIGS. 3A–3C are graphs that are used to illustrate the DCT domain embodiments of the preferred embodiments for improving spatial resolution in an imaging and compression process.

Equation 17 implies that the conditional PDF is an impulse train with magnitudes determined by the areas (of the Gaussian function) within the Δ/2 neighborhood of the impulse locations. This is illustrated in FIG. 3A.

Defining $$I_{m,k}(x) = \frac{1}{\sqrt{2\pi}\,\sigma\Delta} \int_{x-\Delta/2}^{x+\Delta/2} e^{-\frac{(u - G + \hat{G})^2}{2\sigma^2}} du, \tag{18}$$

and using th sifting property, Equation 17 can be rewritten as:

$$p_{\tilde{d}(m,k)|f(n,t_r)}(x) = \sum_{r=-\infty}^{\infty} \delta(x - r\Delta) I_{m,k}(r\Delta) \tag{19}$$

Equation 19 provides the conditional PDF of a single DCT coefficient at location (m, k). Since the errors corresponging to different DCT coefficients are independent, the joint PDF will be the product of the individual PDFs. As a result, the resolution enhancement problem can be written as:

$$\hat{f}(n, t_r) = \underset{f(n,t_r)}{\text{argmax}} \left\{ \left( \prod_{m,k} I_{m,k}(\tilde{d}(m,k)) \right) p_{f(n,t_r)}(f) \right\}, \forall n, \tag{20}$$

Equation 20 provides an optimal way of combining the additive noise and the quantization in accordance with the preferred embodiments of the invention.

Next, two cases will be examined with respect to the relative magnitude of the quantization step size Δ and the standard deviation σ of the additive noise. When the quantization step size Δ is much smaller than the standard deviation σ of the additive noise, Equation 19 becomes:

$$p_{\tilde{d}(m,k)|f(n,t_r)}(x) \cong \sum_{r=-\infty}^{\infty} \left\{ \delta(x - r\Delta) \frac{1}{\sqrt{2\pi}\,\sigma\Delta} e^{-\frac{(r\Delta - G + \hat{G})^2}{2\sigma^2}} \right\} \tag{21}$$

Figure 3B:
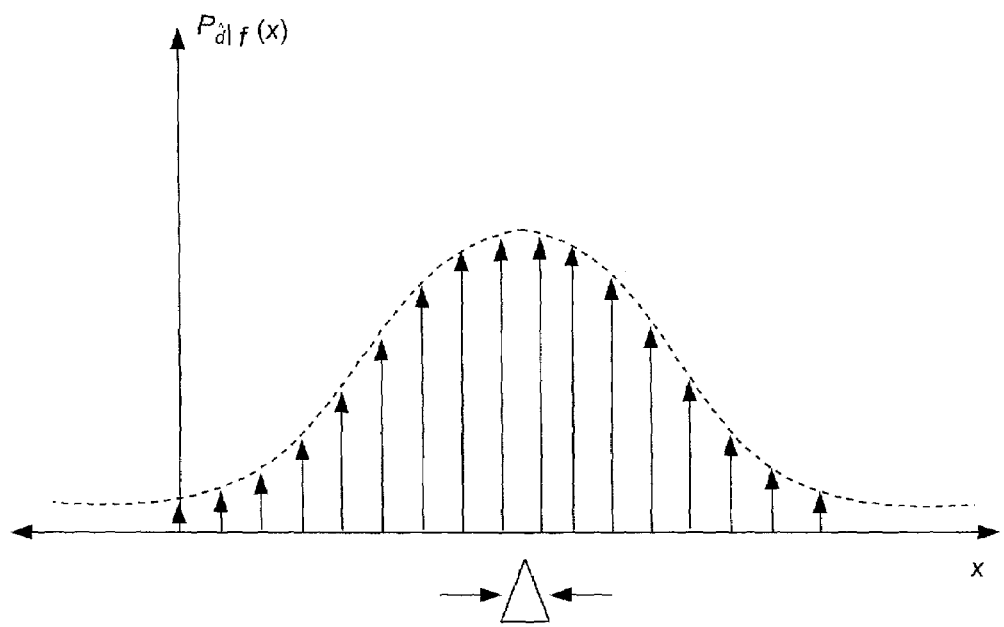
Figure 3C:
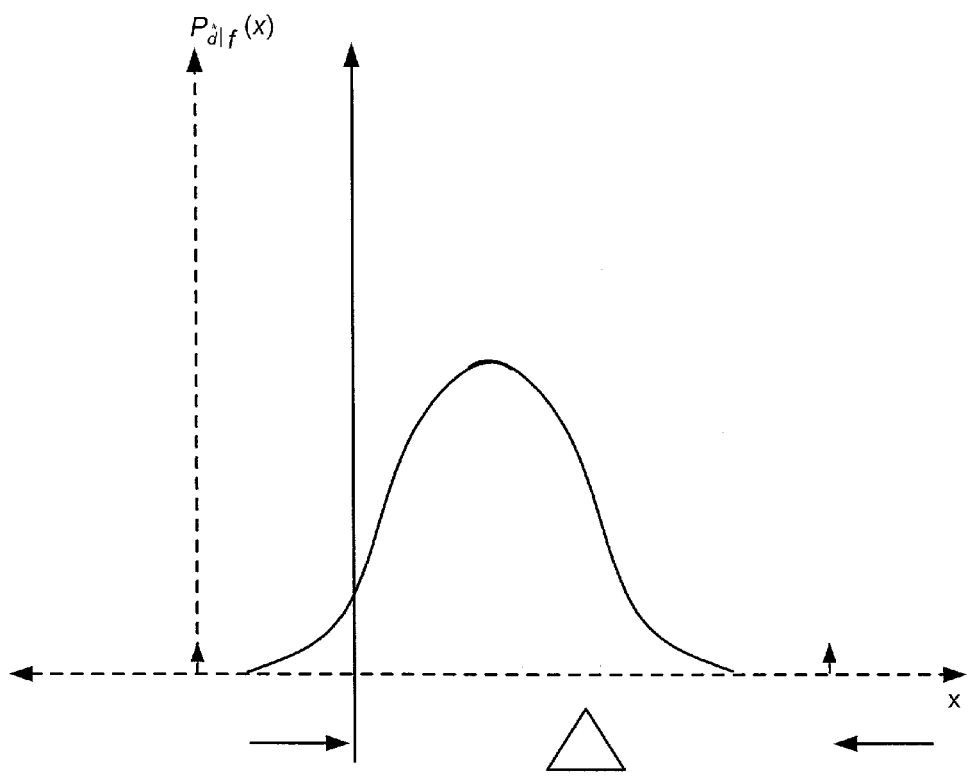

Equation 21 corresponds to a sampled continuous Gaussian distribution with mean G–Ĝ, and variance $\sigma^2$, as illustrated in FIG. 3B. Since the quantization noise is negligible, this case reduces to the optimization problem for a continuous Gaussian PDF:

$$p_{\tilde{d}(m,k)|f(n,t_r)}(x) \cong \frac{1}{\sqrt{2\pi}\,\sigma} e^{-\frac{(x - G + \hat{G})^2}{2\sigma^2}}. \tag{22}$$

Based on this condition PDF and prior image model, a cost function to be minimized can be defined, and optimization techniques can be applied to minimize the cost function.

The second case is when the quantization step size Δ is much larger than the variance σ. In this case, illustrated in FIG. 3C, the conditional PDF becomes an impulse function centered around the value of G–Ĝ. That is, the Gaussian envelope is centered at the value of G–Ĝ, while the impulse function is centered at the closest integer multiple of Δ. Letting $r_0\Delta$ be that center, the conditional PDF becomes:

$$p_{\tilde{d}(m,k)|f(n,t_r)}(x) \cong \delta(x - r_0\Delta) \tag{23}$$

where $$r_0\Delta - \frac{\Delta}{2} \leq G - \hat{G} \leq r_0\Delta + \frac{\Delta}{2}. \tag{24}$$

The initial high resolution image estimate is updated in such way that G−Ĝ lies in the region $$\left[r_0\Delta - \Delta - \frac{\Delta}{2}, r_0\Delta + \frac{\Delta}{2}\right].$$

To be more specific, the estimation errors from wither the lower bounds $$\left(r_0\Delta - \frac{\Delta}{2}\right)$$

or upper bounds $$\left(r_0\Delta + \frac{\Delta}{2}\right)$$

are back-projected onto the high resolution image estimate $f$.

In a typical video encoder, different situations between those two cases can occur at the same time. Quantization step sizes change not only from frame to frame, but also from coefficient to coefficient. The preferred embodiments of the invention can handle these two cases and any other successfully.

In the next following sections, one implementation scheme is presented for the DCT domain embodiments. It is based on an Iterated Conditional Modes (ICM) algorithm, as ICM is known in the art. In ICM, a single optimization problem is turned into many simpler optimization problems to be solved iteratively. Although ICM does not necessarily converge to the globally optimal solution, when the initial estimate is close, it yields satisfactory results.

Figure 4:
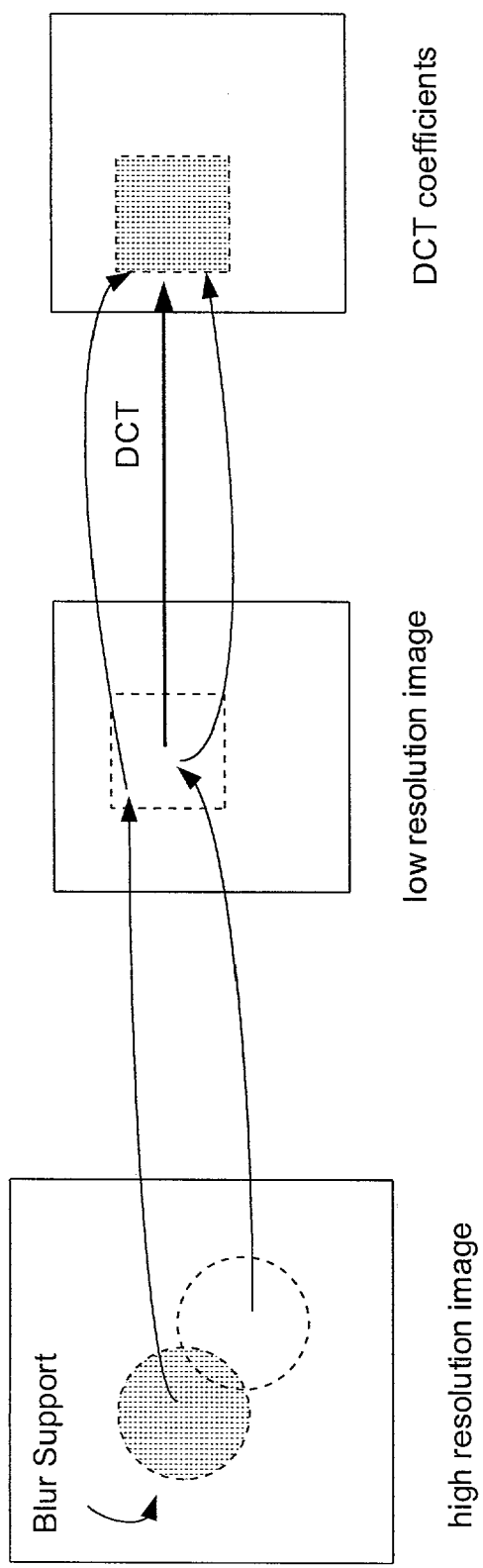
FIG. 4 is a block diagram that is used to illustrate the DCT domain embodiments of the preferred embodiments for improving spatial resolution in an imaging and compression process.

The optimization problem given in Equation 20 can be implemented using ICM assuming that all the pixels except one are fixed, and the optimal intensity value for that single pixel is estimated. Repeating the procedure for all pixels iteratively results in a convergence to a solution. In other words, the following optimization problem is solved for each pixel:

$$\hat{f}(n, t_r) = \underset{f(n,t_r)}{\operatorname{argmax}} \left\{ \left( \prod_{m,k \in S_{n,t_r}} I_{m,k}(\tilde{d}(m,k)) \right) p_{f(n,t_r)}(f) \right\}, \quad (25)$$

where $S_{n, t_r}$ represents the set of DCT coefficients that are affected by the pixel at (n, $t_r$). Referring to FIG. 4, since the blur support is usually limited to a few pixels, there is no need to consider all possible mapping combinations between the high resolution image and the DCT coefficients. The set that has nonzero mapping to a particular pixel or DCT coefficient can be computed easily, which reduces the run-time of the algorithm of the preferred embodiments significantly.

Taking the natural logarithm of Equation 25, the objective function En, $t_r$ to be maximized for the pixel at location (n, $t_r$) is given by:

$$E_{n,t_r} = \log\{p_{f(n,t_r)}(f)\} + \sum_{m,k \in S_{n,t_r}} \log\{I_{m,k}(\tilde{d}(m,k))\}. \quad (26)$$

For the prior image PDF, Markov Random Fields, as the mechanisms are known in the art, that model the local characteristics of the image are readily applicable to this framework. A Maximum Likelihood (ML) solution will be provided, with the understanding that other prior image models can be employed. For this case the objective function to be maximized is given by:

$$E_{n,t_r} = \sum_{m,k \in S_{n,t_r}} \log\{I_{m,k}(\tilde{d}(m,k))\}. \quad (27)$$

In one ICM technique, at each iteration, a new candidate solution is generated; if this candidate solution increases the objective function En, $t_r$, it is accepted, otherwise it is rejected. However, the method for generating the candidate solution is not specified. In order to decide on an update scheme, several different cases will be examined.

As described above, when the quantization step size is much smaller than the standard deviation of the additive noise, the conditional PDF $\rho_{\tilde{d}(m,k)|f(n,t_r)(x)}$ reduces to a Gaussian function indicating that the additive noise is the dominant source of error. (See Equation 22.) Taking the derivative of the exponent in Equation 22 with respect to $f(n, t_r)$, it can be shown that the gradient-descent algorithm gives the update equation:

$$f(n, t_r) \leftarrow f(n, t_r) + \tau \sum_{m,k \in S_{n,t_r}} \left\{ h_{DCT}(n, t_r; m, k) \frac{(\tilde{d}(m,k) - G + \hat{G})}{\sigma^2} \right\} \quad (28)$$

where τ is the update step size that can be fixed or variable.

At the other extreme, when the quantization step size is much larger than the standard deviation of the additive noise, the update is done by back-projecting the error defined by the DCT bounds. As a result, the difference between the observed data and the simulated data is input back into the estimated image, such that the next time the simulated imaging and compression processes are applied, the simulated data is consistent with the observed data. This back-projection can map from a single DCT coefficient to a set of high resolution image pixels, and be repeated for all DCT coefficients; or it can map from a set of DCT coefficients to a single high resolution image pixel, and be repeated for all high resolution image pixels. These sets of high resolution images are determined by the mapping $h_{DCT}(n, t_r; m, k)$. Hence, one way to update the high resolution image is:

$$f(n, t_r) \leftarrow \qquad (29)$$

$$f(n, t_r) + \sum_{m,k \in S_{n,t_r}} \begin{cases} h_{DCT}(n, t_r; m, k) \frac{(\tilde{d}(m, k) - G + \hat{G} - \Delta/2)}{\sum_n |h_{DCT}(n, t_r; m, k)|^2}; G - \hat{G} < \tilde{d}(m, k) - \Delta/2 \\ h_{DCT}(n, t_r; m, k) \frac{(\tilde{d}^n(m, k) - G + \hat{G} + \Delta/2)}{\sum_n |h_{DCT}(n, t_r; m, k)|^2}; G - G > \tilde{d}(m, k) + \Delta/2 \\ 0; \text{elsewhere} \end{cases}$$

Examining Equations 28 and 29, one initial choice of an update procedure will be of the form:

$$f(n, t_r) \leftarrow \qquad (30)$$
$$f(n, t_r) + \sum_{m,k \in S_{n,t_r}} \{h_{DCT}(n, t_r; m, k)(\tilde{d}(m, k) - G + \hat{G})\tau(n, t_r; m, k)\}$$

with the variable step size τ(n, t_r; m, k) being a function of Δ/σ. In the simulations of one embodiment, $$1 \Big/ \sum_n |h_{DCT}(n, t_r; m, k)2|^2$$

was used for τ(n, t_r; m, k).

Combining these results suggests one way of implementing the proposed framework as:

1. A reference frame is chosen, and is bilinearly interpolated to obtain an initial estimate for the high resolution image $f(n, t_r)$.
2. The motion between the high resolution image estimate and another bilinearly interpolated low resolution frame is computed.
3. The blur mapping $h_{DCT}$ between the high resolution image estimate and the DCT coefficients of the low resolution image is evaluated. For each pixel location in the high resolution image estimate, the set of DCT coefficients $(S_{n, t_r})$ affected by $h_{DCT}$ is computed.
4. For each location in the high resolution image estimate, the objective function $E_{n, t_r}$ is computed.
5. The high resolution image pixels are updated using the following procedure:
   (a) Update the intensity of each pixel is as in Equation 30,
   (b) Compute the change in the objective function,
   (c) If the change in the objective function is positive, accept the update, otherwise reject it.
6. Go to step 2) and repeat this procedure for another low resolution frame until a stopping criterion is reached.

Figure 5:
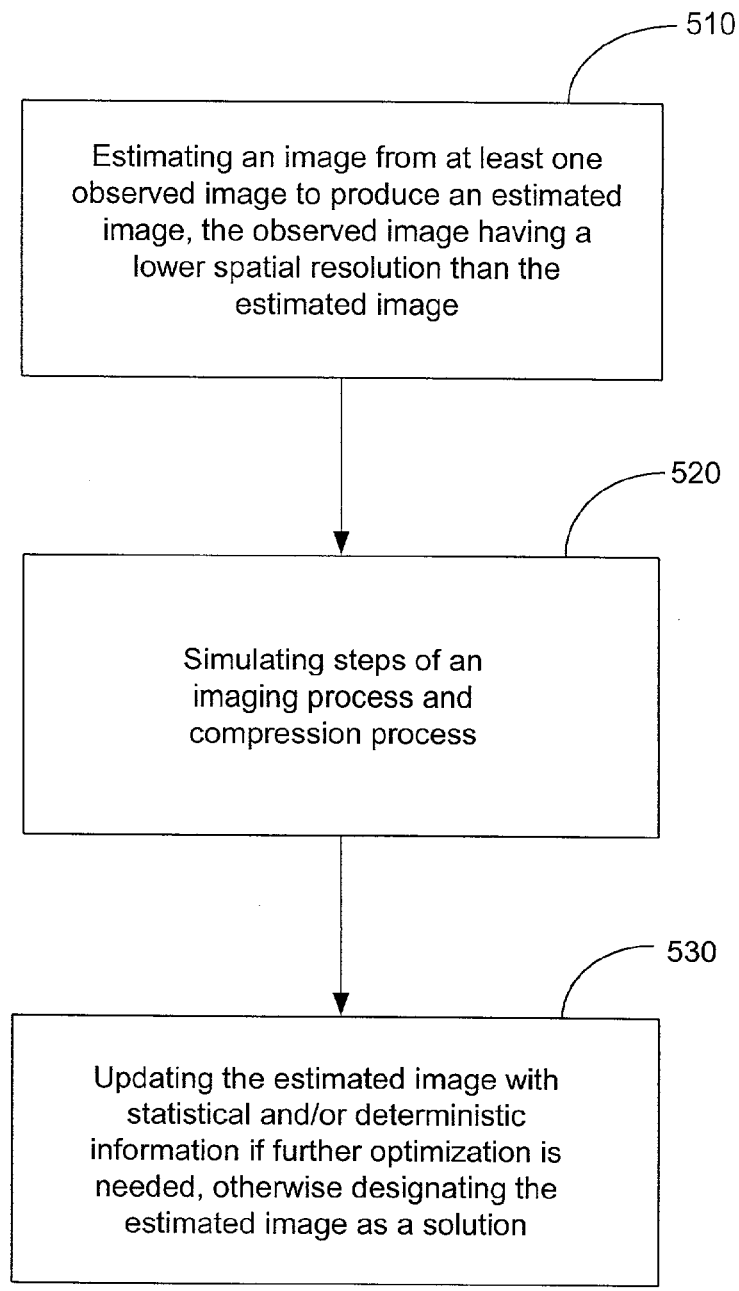
FIG. 5 is a flow diagram of one DCT domain embodiment of the preferred embodiments.

FIG. 5 is a flow diagram of one DCT domain embodiment of the preferred embodiments. Step 510 includes estimating an image from at least one observed image to produce an estimated image, the observed image having a lower spatial resolution than the estimated image. Step 520 includes simulating steps of an imaging process and compression process. Step 530 includes updating the estimated image with statistical and/or deterministic information if further optimization is needed, otherwise designating the estimated image as a solution. Other embodiments for improving image quality includes the spatial domain embodiments, wherein the updating includes decompressing the observed DCT coefficients and providing updates in the spatial domain. Spatial domain superresolution reconstruction techniques are generally less computationally complex than the DCT-domain techniques discussed above. This is because of the fact that each pixel in the spatial domain maps to 64 DCT coefficients when an 8×8 block-DCT is taken. This increases the blur mapping size significantly, which has a direct effect on the computational cost. In this section, quantization error statistics are used in a spatial-domain MAP estimation framework, in accordance with one embodiment of the invention. With reference to FIG. 2, the spatial-domain low resolution frames, y(1, k), are obtained by taking the inverse DCT of the quantized DCT coefficients, and then motion-compensating the residual frames. The quantization operation is a nonlinear process that can be denoted by the operator Q {·} according to:

$$\tilde{d}(m, k) = Q\{d(m, k)\} = Q\{G(m, k) - \hat{G}(m, k) + V(m, k)\} \qquad (31)$$

Using Equation 31, this inverse quantization process can be formulated as:

$$y(l, k) = IDCT\{\tilde{d}(m, k)\} + \hat{g}(l, k) \qquad (32)$$
$$= IDCT\{Q\{G(m, k) - \hat{G}(m, k) + V(m, k)\}\} + \hat{g}(l, k)$$

where IDCT (·) is the 8×8 block inverse DCT operator. The MAP estimator can be written as:

$$\hat{f}(n, t_r) = \underset{f(n,t_r)}{\mathrm{argmax}} \{p_{y(l,k_1),...,y(l,k_p)|f(n,t)}(\cdot) p_{f(n,t_r)}(\cdot)\} \qquad (33)$$

Equation 33 implies that the desired solution maximizes the likelihood of both the high resolution image and the observed data given the estimated image. The conditional PDF $P_{y(1, kl), ..., y(1, kp)\cdot|f(n, t_r)}$ ( ) and the prior image PDF $p_{f(n, t_r)}$ ( ) is preferably known for MAP estimation. Simple Gaussian models or more complicated ones can be assumed for the prior image PDF $p_{f(n, t_r)}$ ( ). Unfortunately, there is no closed-form solution for the conditional PDF $p_{y(1, kl), ..., y(1, kp)\cdot|f(n, t_r)}$ ( ) since the IDCT (·) and (·) operators (in Equation 32) do not commute. However, this distribution can be computed experimentally and saved in a look-up table. It is also possible to fit a model to the distribution. This can be done once and used for all reconstructions afterwards. In order to demonstrate the efficacy of the method, assume that the noise is an independent identically distributed additive white Gaussian process, which results in an analytical formula for the error PDF at the quantizer output. Other choices for the error PDF under different assumptions can be used to derive different PDF models. This error PDF is the convolution of a Gaussian PDF (coming from the additive noise) with a uniform PDF (coming from the quantization process). Since the error PDFs at different DCT coefficients are independent of each other, the distribution of the error PDFs after the IDCT can be found. In some implementations, for DCT coefficients that are observed to be zero, a Laplacian model fits well for the quantization error; for the non-zero quantized DCT coefficients, the uniform model, which assumes that the coefficients are distributed uniformly within the quantization bounds, is better.

For a conditional PDF, a Gaussian distribution can be assumed. Letting $H(l, k; n\ t_r)$ be the operator applying the blocks given in FIG. 2 on $f(n, t_r)$, the conditional PDF is proportional to $\exp\{-\|y(l, k)-H(l, k; n\ t_r) f(n, t_r)\|^2\}$. For the prior image PDF, a local conditional PDF based on Markov Random Fields can be assumed. A Markov-based local PDF preferably penalizes the difference between a pixel intensity and an estimate value that is obtained by averaging the intensities of its four neighbor pixels. That is, the local conditional PDF is proportional to exp $$\left\{-\left\|f(n, t_r) - \frac{1}{4}\sum_{i \in N} f(i, t_r)\right\|^2\right\}$$

where N represents the four neighbors of the pixel at $(n, t_r)$. An iterated conditional modes (ICM) implementation of the algorithms of the spatial domain embodiments updates each pixel intensity iteratively by minimizing the weighted sum of exponents in Equation 34 below:

$$\hat{f}(n, t_r) = \underset{f(n,t_r)}{\operatorname{argmin}}\left\{\alpha\|y(l, k) - H(l, k; n, t_r)f(n, t_r)\|^2 + (1-\alpha)\left\|f(n, t_r) - \frac{1}{4}\sum_{i \in N} f(i, t_r)\right\|^2\right\} \qquad (34)$$

where α determines the relative contribution of the conditional and prior PDFs. One implementation of the spatial domain embodiments includes the following approach:
1. Choose a reference frame from the video sequence, bilinearly interpolate it to obtain an initial estimate.
2. Estimate the motion between the reference and other frames, and compute $H(l, k; n, tr)$.
3. Determine the maximum number of iterations, MaxIter.
4. n=1 to MaxIter,
   (a) Choose a low resolution observation.
   (b) For each pixel in the low resolution observations $y(l, k)$,
       (i) Determine the sets of pixels in $f(n, t_r)$ that affects the particular pixel in the low-resolution image through the mapping $H(l, k; n, t_r)$.
       (ii) Keep all the pixels values except for one pixel in the given set, and find the value that minimizes the sum given in Equation 34.
       (iii) Repeat for the other pixels in the set.
   (c) Choose another low-resolution observation, and go to Step (b).

Figure 6:
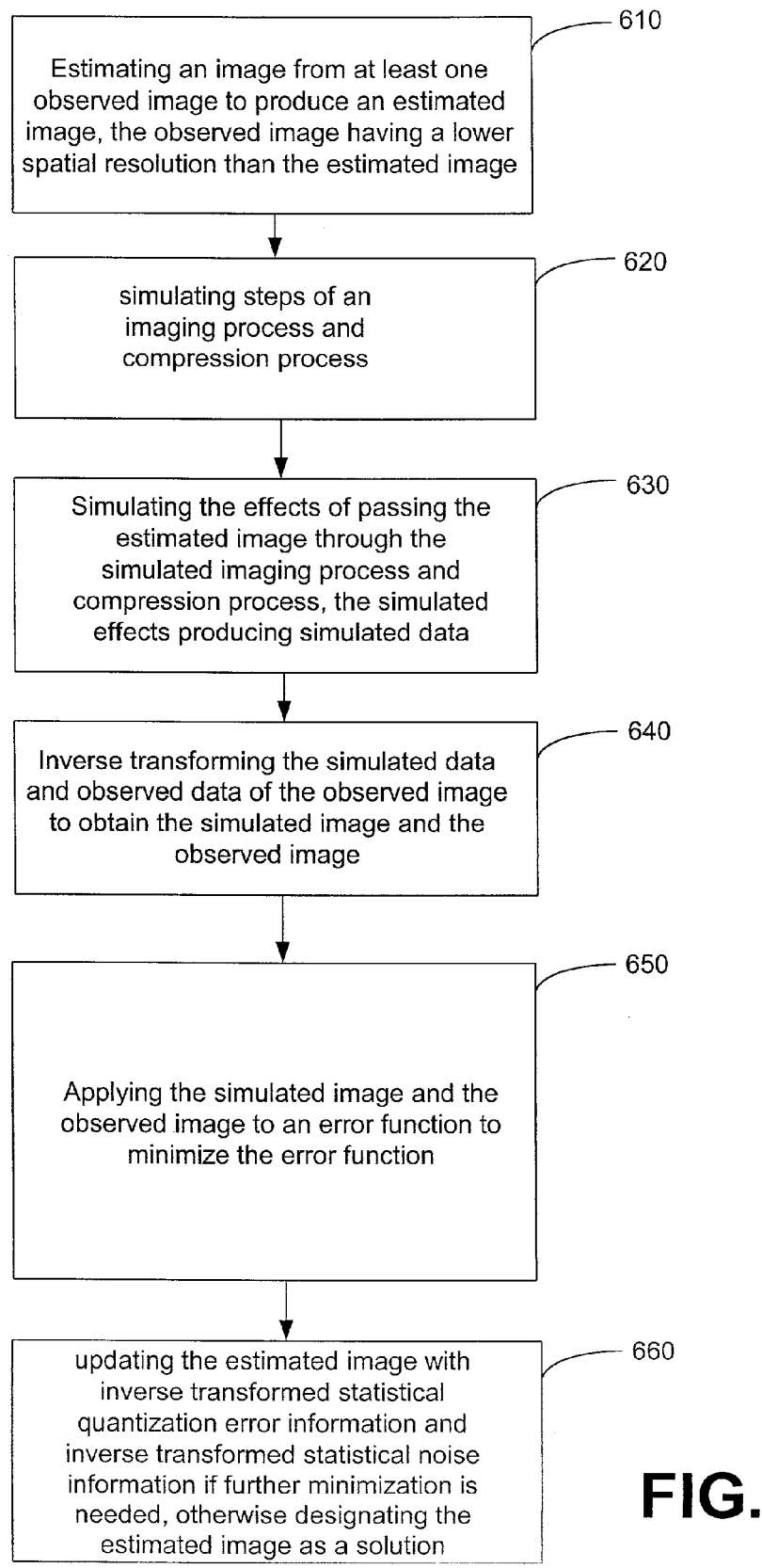
FIG. 6 is a flow diagram of one spatial domain embodiment of the preferred embodiments.

FIG. 6 is a flow diagram of one spatial domain embodiment of the preferred embodiments. Step 610 includes estimating an image from at least one observed image to produce an estimated image, the observed image having a lower spatial resolution than the estimated image. Step 620 includes simulating steps of an imaging process and compression process. Step 630 includes simulating the effects of passing the estimated image through the simulated imaging process and compression process, the simulated effects producing simulated data, and step 640 includes inverse transforming the simulated data and observed data of the observed image to obtain the simulated image and the observed image. Step 650 includes applying the simulated image and the observed image to an error function to minimize the error function, the error function minimization depending on the difference between the simulated image and the observed image, the error minimization further dependent on the likelihood of the estimated image, the likelihood favoring a smooth image solution. Step 660 includes updating the estimated image with inverse transformed statistical quantization error information and inverse transformed statistical noise information if further minimization is needed, otherwise designating the estimated image as a solution.

The superprecision embodiments will now be discussed. This section presents a model that establishes the connection between a high-resolution source image and multiple low bit-dept image observations. This connection is used to enhance the gray scale resolution of the images. With continued reference to FIG. 2, and referring to FIG. 7A, the superprecision model generally includes two components. The image capture model 710 simulates the image capture process. A high-resolution image, $f^{(N_1)}(n_1, n_2)$, is captured by an imaging device to produce the low resolution images, $g^{(N_1)}(m_1, m_2, k)$. Here the superscript $N_1$ represents the number of bits used to represent each pixel and $(n_1, n_2)$ and $(m_1, m_2, k)$ are the spatial pixel coordinates of the high-resolution image and the $k^{th}$ low-resolution image, respectively. The image capture process is a linear, shift-varying (LSV) operation that includes motion (for example, of a camera or the objects in the scene), blur (because of the nonzero sensor aperture time, the nonzero physical dimensions of the individual sensor elements, the degree of focus, etc.), and sampling with a low-resolution grid. Assume these effects are simulated, except for the sensor aperture time, which is taken to be zero. In other embodiments, nonzero sensor aperture can be simulated.

According to this model, the mapping from a high-resolution image to a low spatial-resolution image is preferably expressed as a weighted sum of the high-resolution image pixels, where the weights are the value of a space-invariant point-spread function (PSF) at the corresponding pixel location. The center of the PSF depends upon the motion between the high-resolution image and the low-resolution images. This is depicted in FIG. 7B. Motion vectors from each low spatial-resolution image to the high-resolution image determine how each pixel is mapped. The normalized PSF that characterizes the image capture device (e.g., camera) is centered at the location where the motion vector points, and from it the weights on the high-resolution image grid are found. Defining $h(m_1, m_2, k; n_1, n_2)$ as this mapping, the image capture process can be modeled by:

$$g^{(N_1)}(m_1, m_2, k) = \sum_{n_1, n_2} h(m_1, m_2, k; n_1, n_2) f^{(N_1)}(n_1, n_2) \qquad (35)$$

Equation 35 provides the relation between a single high-resolution image and the set of low spatial-resolution images.

The bit-rate reduction block 720 (FIG. 7A) simulates gray scale resolution reduction, which is a reduction in the number of bits used to represent each pixel. Bit depth reduction from $N_1$ bits to $N_2$ bits is equivalent to the operation:

$$g^{(N_2)}(m_1, m_2, k) = \text{round}\{2^{N_2-N_1} g^{(N_1)}(m_1, m_2, k)\}, \qquad (36)$$

where $g^{(N_2)}(m_1, m_2, k)$ corresponds to the low-resolution (both in gray scale and in the spatial variables) image observations. The factor $2^{N_2-N_1}$ scales the image to the new range, and the rounding operation round $\{\cdot\}$, which rounds the argument to the nearest integer, effects the quantization.

Letting $\delta(m_1, m_2, k)$ denote the error introduced by rounding, Equation 36 can be written as:

$$g^{(N_2)}(m_1, m_2, k) = 2^{N_2-N_1} g^{(N_1)}(m_1, m_2, k) + \delta(m_1, m_2, k), \qquad (37)$$

where $$|\delta(m_1, m_2, k)| < 0.5 \qquad (38)$$

(Since the round $\{\cdot\}$ operator rounds to the nearest integer, the maximum error during the operation is 0.5.) If the images are transformed coded (for example using JPEG or MPEG), a similar relation can be formulated in the transform domain. A common transform is the discrete cosine transform (DCT), which is here applied on 8×8 blocks. Taking an 8×8 block DCT of Equation 37 results in the following:

$$G^{(N_2)}(l_1, l_2, k) = 2^{N_2-N_1} G^{(N_1)}(l_1, l_2, k) + \Delta(l_1, l_2, k), \qquad (39)$$

where $G^{(N_2)}(l_1, l_2, k)$, $G^{(N_1)}(l_1, l_2, k)$, and $\Delta(l_1, l_2, k)$ are the DCT of $g^{(N_2)}(m_1, m_2, k)$, $g^{(N_1)}(m_1, m_2, k)$, and $\Delta(l_1, l_2, k)$ respectively. $\Delta(l_1, l_2, k)$ is also bounded in magnitude since $\delta(l_1, l_2, k)$ is bounded, but its bounds depend on the position $(l_1, l_2)$. Note that the bounds of $\Delta(l_1, l_2, k)$ are not equal to the DCT of the bounds of $\delta(l_1, l_2, k)$.) Applying the block-DCT to Equation 35, $G^{(N_1)}(l_1, l_2, k)$ can be written as:

$$G^{(N_1)}(l_1, l_2, k) = \sum_{n_1, n_2} h_{DCT}(l_1, l_2, k; n_1, n_2) f^{(N_1)}(n_1, n_2) \qquad (40)$$

where $h_{DCT}(l_1, l_2, k; n_1, n_2)$ is the block-DCT of $h(m_1, m_2, k; n_1, n_2)$. Mathematically, the relation can be written as:

$$h_{DCT}(l_1, l_2, k; n_1, n_2) = \sum_{m_1=L(l_1)}^{L(l_1)+7} \sum_{m_2=L(l_2)}^{L(l_2)+7} K(l_1, l_2; (m_1)_8, (m_2)_8) h(m_1, m_2, k; n_1, n_2) \qquad (41)$$

where $(\cdot)$ is the modulo 8 operator, $L(x) = [x/8]$, and $K(l_1, l_2; m_1, m_2)$ is the DCT kernel given by:

$$K(l_1, l_2; m_1, m_2) = k_{l_1} k_{l_2} \cos\left(\frac{(2m_1+1)l_1\pi}{16}\right) \cos\left(\frac{(2m_2+1)l_2\pi}{16}\right) \qquad (42)$$

$k_l$ is the normalization factor $$k_{l_i} = \begin{cases} \frac{1}{4\sqrt{2}}, & l_i \neq 0 \\ \frac{1}{4}, & l_i = 0 \end{cases}, i = 1, 2 \qquad (43)$$

To summarize we have two equations that relate the high resolution image to low resolution images and DCT coefficients:

$$g^{(N_2)}(m_1, m_2, k) = \qquad (44)$$
$$2^{N_2-N_1} \sum_{n_1, n_2} h(m_1, m_2, k; n_1, n_2) f^{(N_1)}(n_1, n_2) + \delta(m_1, m_2, k),$$

and $$G^{(N_2)}(l_1, l_2, k) = \qquad (45)$$
$$2^{N_2-N_1} \sum_{n_1, n_2} h_{DCT}(l_1, l_2, k; n_1, n_2) f^{(N_1)}(n_1, n_2) + \Delta(l_1, l_2, k).$$

These two equations can be used in POCS-based super-precision estimation algorithms that are formulated in the spatial and transform domains, according to a superprecision embodiment of the preferred embodiments of the invention. Equation 45 can be extended to include the compression process where the DCT coefficients are quantized according to quantization tables.

From Equation 44, it is seen that the value of $2^{N_2-N_1} g^{(N_1)}(m_1, m_2, k)$ falls within the 0.5 proximity of the observed pixel intensity $g^{(N_2)}(m_1, m_2, k)$. This information can be used to define a convex constraint set for each observed pixel. These constraint sets narrow the feasibility set of the estimated image. That is, the estimated image is closer to the true high resolution image.

Figure 7A:
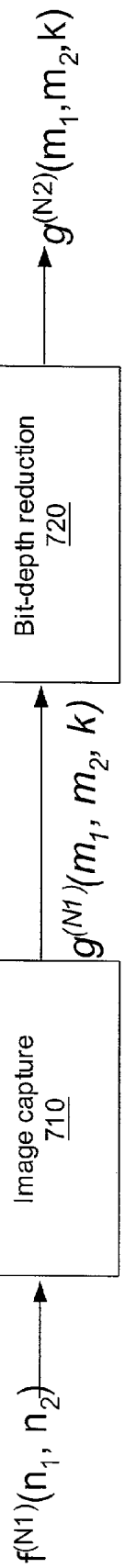
FIG. 7A is a block diagram that is used to illustrate superprecison embodiments of the preferred embodiments for improving gray scale resolution.
Figure 7B:
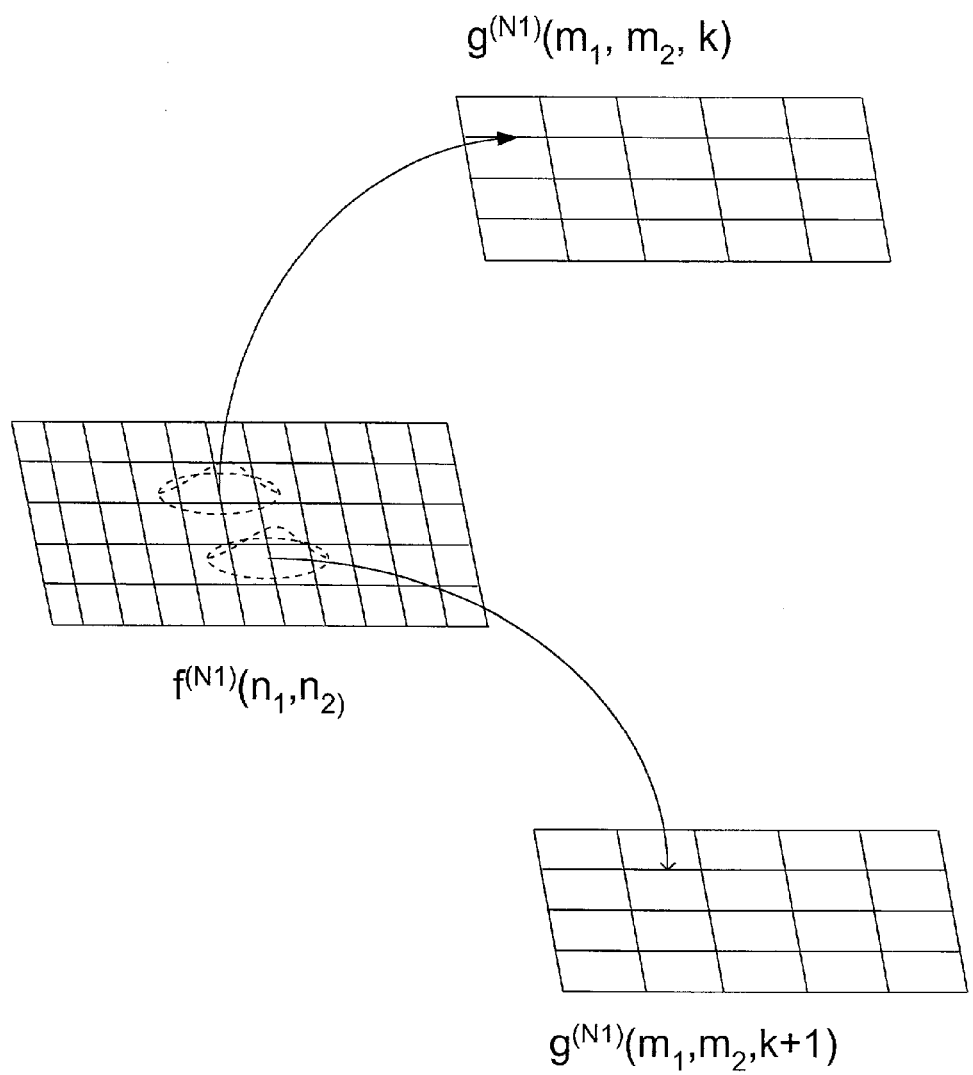
FIG. 7B is a schematic diagram that is used to illustrate the superprecision embodiments of the preferred embodiments for improving gray scale resolution.

The image capture process shown in FIG. 7A is applied on an initial high-resolution image estimate $x^{(N_1)}(n_1, n_2)$, and then scaled by the factor $2^{N_2-N_1}$. The result is compared to the observations $g^{(N_2)}(m_1, m_2, k)$. It is known that the residual, the difference between the computed and the observed images, must be less than 0.5 in magnitude if the estimate is correct. If the residual is greater than 0.5, then the error is back-projected onto the initial estimate so that the next time the image capture model and scaling are applied, it will fall within the 0.5 proximity of the observations.

Defining the residual as:

$$r_x(m_1, m_2, k) \equiv \qquad (46)$$
$$g^{(N_2)}(m_1, m_2, k) - 2^{N_2-N_1} \sum_{n_1, n_2} h(m_1, m_2, k; n_1, n_2) x^{(N_1)}(n_1, n_2)$$

a convex constraint set can be written for an arbitrary image $x^{(N_1)}(n_1, n_2)$ as follows:

$$C_{(m_1, m_2, k)} = \{x^{(N_1)}(n_1, n_2): |r_x(m_1, m_2, k)| < 0.5\}. \qquad (47)$$

The projection operation onto these convex sets is given by:

$$P_{(m_1,m_2,k)}[x^{(N_1)}(n_1,n_2)] = x^{(N_1)}(n_1,n_2) + \begin{cases} \dfrac{2^{N_1-N_2}(r_x(m_1,m_2,k)-0.5)h(m_1,m_2,k;n_1,n_2)}{\sum_{n_1,n_2}|h(m_1,m_2,k;n_1,n_2)|^2}, & r_x(m_1,m_2,k) > 0.5 \\ 0, & -0.5 \leq r_x(m_1,m_2,k) \leq 0.5 \\ \dfrac{2^{N_1-N_2}(r_x(m_1,m_2,k)+0.5)h(m_1,m_2,k;n_1,n_2)}{\sum_{n_1,n_2}|h(m_1,m_2,k;n_1,n_2)|^2}, & r_x(m_1,m_2,k) < -0.5 \end{cases} \quad (48)$$

Equation 45 provides the relation between the DCT coefficients and the high resolution image $G^{(N_2)}(l_1, l_2, k)$. The DCT coefficients $G^{(N_2)}(l_1, l_2, k)$ are quantized in the process of compression. Defining $\tilde{G}^{(N_2)}(l_1, l_2, k)$ as the quantized DCT coefficients, and $Q(l_1, l_2, k)$ as the quantization error, the following can be written:

$$\tilde{G}^{(N_2)}(l_1, l_2, k) = G^{(N_2)}(l_1, l_2, k) + Q(l_1, l_2, k) \quad (49)$$

where $Q(l_1, l_2, k)$ is bounded by half of the quantization step size at location $(l_1, l_2)$. Using Equation 45, the following is obtained in Eq. 50 below:

$$G^{(N_2)}(l_1, l_2, k) =$$

$$2^{N_2-N_1}\sum_{n_1,n_2} h_{DCT}(l_1, l_2, k; n_1, n_2) f^{(N_1)}(n_1, n_2) + \Delta(l_1, l_2, k) + Q(l_1, l_2, k).$$

The sum of $\Delta(l_1, l_2, k)$ and $Q(l_1, l_2, k)$, is bounded by $B(l_1, l_2, k)$, which is equal to the sum of the bounds of $\Delta(l_1, l_2, k)$ and $Q(l_1, l_2, k)$. That is, $$|\Delta(l_1, l_2, k) + Q(l_1, l_2, k)| < B(l_1, l_2, k), \quad (51)$$

where Equation 52 is:

$$B(l_1, l_2, k) = 0.5 \sum_{m_1=L(l_1)}^{L(l_1)+7} \sum_{m_2=L(l_2)}^{L(l_2)+7} |K(l_1, l_2; (m_1)_8, (m_2)_8)| + \frac{\text{Quantization step size at location }(l_1, l_2)}{2}.$$

Equation 50, along with the bound $B(l_1, l_2, k)$ allows for the derivation of a POCS reconstruction algorithm in the compressed domain that is analogous to the spatial-domain algorithm derived in the previous section.

To create the projection operator, define the compressed-domain residual as $$R_x(l_1, l_2, k) \equiv \quad (52)$$

$$\tilde{G}^{(N_2)}(l_1, l_2, k) - 2^{N_2-N_1}\sum_{n_1,n_2} h_{DCT}(l_1, l_2, k; n_1, n_2) x^{(N_1)}(n_1, n_2)$$

the convex constraint set for an arbitrary image $x^{(N_1)}(n_1, n_2)$ is as follows:

$$C_{(l_1, l_2, k)} = \{x^{(N_1)}(n_1, n_2) : |R_x(l_1, l_2, k)| < B(l_1, l_2, k)\} \quad (53)$$

The projection operation onto these convex sets is given by Equation 54 below:

$$P(l_1,l_2,k)[x(N1)(n_1-n_2)] = \begin{cases} x^{(N_1)}(n_1,n_2) + \dfrac{2^{N_1-N_2}(R_x(l_1,l_2,k)-B(l_1,l_2,k))h_{DCT}(l_1,l_2,k;n_1,n_2)}{\sum_{n_1,n_2}|h_{DCT}(l_1,l_2,k;n_1,n_2)|^2}, & Rx(l_1,l_2,k) > B(l_1,l_2,k) \\ x^{(N_1)}(n_1,n_2), & -B(l_1,l_2,k) \leq R_x(l_1,l_2,k) \leq B(l_1,l_2,k) \\ x^{(N_1)}(n_1,n_2) + \dfrac{2^{N_1-N_2}(R_x(l_1,l_2,k)+B(l_1,l_2,k))h_{DCT}(l_1,l_2,k;n_1,n_2)}{\sum_{n_1,n_2}|h_{DCT}(l_1,l_2,k;n_1,n_2)|^2}, & Rx(l_1,l_2,k) < -B(l_1,l_2,k) \end{cases}$$

Implementations of both the spatial- and transformed-domain algorithms are described below. In the spatial-domain implementation the error back-projected is the error in the pixel intensities. In the transform-domain implementation it is the error in the DCT coefficients that is back-projected. One algorithm of the superprecision embodiments includes the following:

1. Choose a reference frame and bilinearly interpolate it to get an initial fine-grid image.
2. Extend the bit depth of this image to the required bit depth by multiplying each pixel intensity by $2^{N_1-N_2}$ and filling in the last $N_1-N_2$ bits randomly. The resulting image, $x^{(N_1)}(n_1-n_2)$, is an initial estimate for the high resolution image $f^{(N_1)}(n_1, n_2)$.
3. Compute the motion between the reference frame and one of the low-bit depth images, $g^{(N_2)}(m_1, m_2, k)$.
4. Using the motion estimates, compute the mapping $h(m_1, m_2, k; n_1, n_2)$ for each pixel in the current image $g^{(N_2)}(m_1, m_2, k)$. (Compute $h_{DCT}(l_1, l_2, k; n_1, n_2)$ for each DCT coefficient in the case of transform-domain implementation)
5. For each pixel (DCT coefficient) in the current image,
    (a) Compute the pixel intensity (DCT coefficient value) from the estimate $x^{(N_1)}(n_1, n_2)$ by applying the image capture processing model and scaling,
    (b) Compute the residual $r_x(m_1, m_2, k)$ ($R_x(l_1, l_2, k)$) and back-project the error to the estimate $x^{(N_1)}(n_1, n_2)$ using Equation 48 (Equation 52).
6. Stop, if a stopping criterion is reached; otherwise, choose another low-bit depth image, and go to step 2.

It should be noted that, by construction, the superprecision embodiments have the potential to achieve both spatial and gray scale resolution enhancement at the same time. If the high-resolution image estimate has a finer grid than the observation, both spatial and gray scale resolution enhancement are achieved. If they have the same sampling grid, only gray scale resolution enhancement is achieved.

Figure 8:
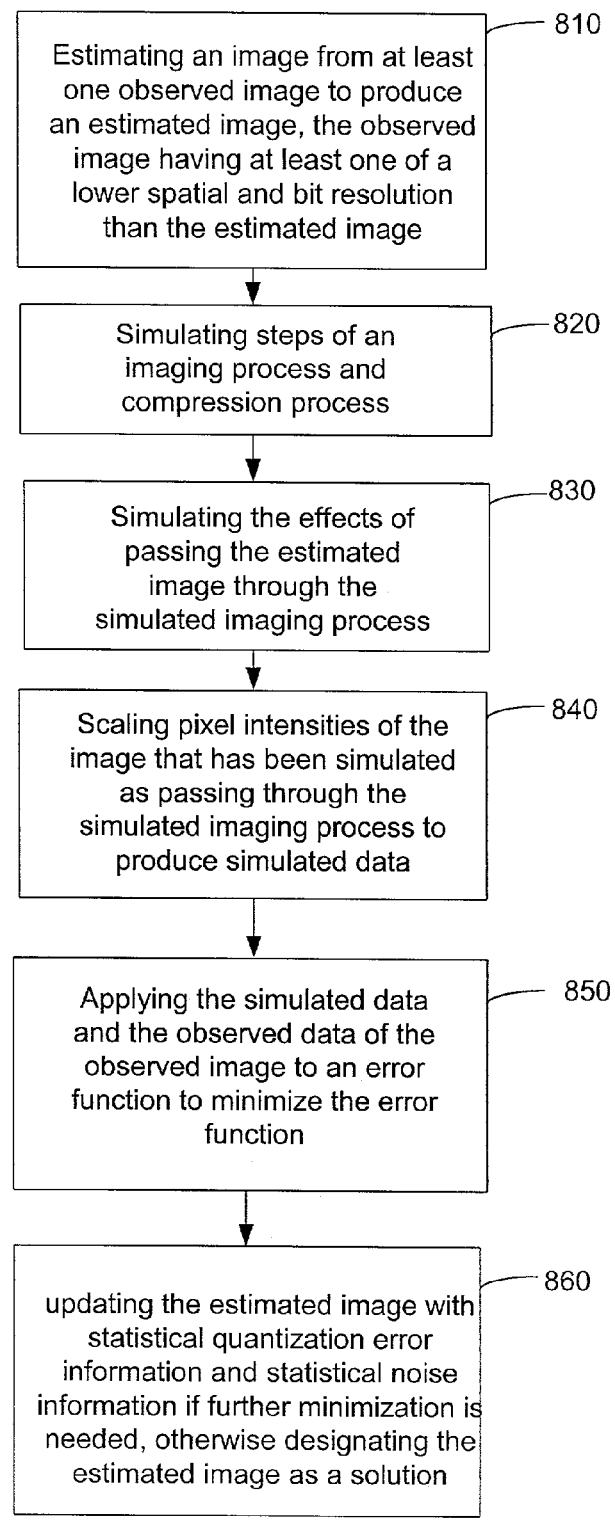
FIG. 8 is a flow diagram of one superprecision embodiment of the preferred embodiments.

FIG. 8 is a flow diagram of one superprecision embodiment of the preferred embodiments. Step 810 includes estimating an image from at least one observed image to produce an estimated image, the observed image having at least one of a lower spatial and bit resolution than the estimated image. Step 820 includes simulating steps of an imaging process and compression process. Step 830 includes simulating the effects of passing the estimated image through the simulated imaging process. Step 840 includes scaling pixel intensities of the image that has been simulated as passing through the simulated imaging process to produce simulated data. Step 850 includes applying the simulated data and the observed data of the observed image to an error function to minimize the error function, the error function minimization depending on the difference between the simulated data and the observed data, the error minimization further dependent on the likelihood of the estimated image, the likelihood favoring a smooth image solution. Step 860 includes updating the estimated image with statistical quantization error information and statistical noise information if further minimization is needed, otherwise designating the estimated image as a solution.

In some embodiments, blocking artifacts can be reduced. For example, at low bit rates in conventional systems, DCT coefficients are coarsely quantized. This coarse quantization with independent neighboring blocks gives rise to blocking artifacts (e.g., visible block boundaries). The preferred embodiments of the invention, when implemented, inherently performs block artifact reduction.

In addition, the preferred embodiments of the invention bit-rate scalability. That is, when implemented, the preferred embodiments have application from very low bit rate video to very high bit rate video, and thus the preferred embodiments are scaleable with respect to bit-rate, frame-rate, image size, video content, among others.

Figure 9A:
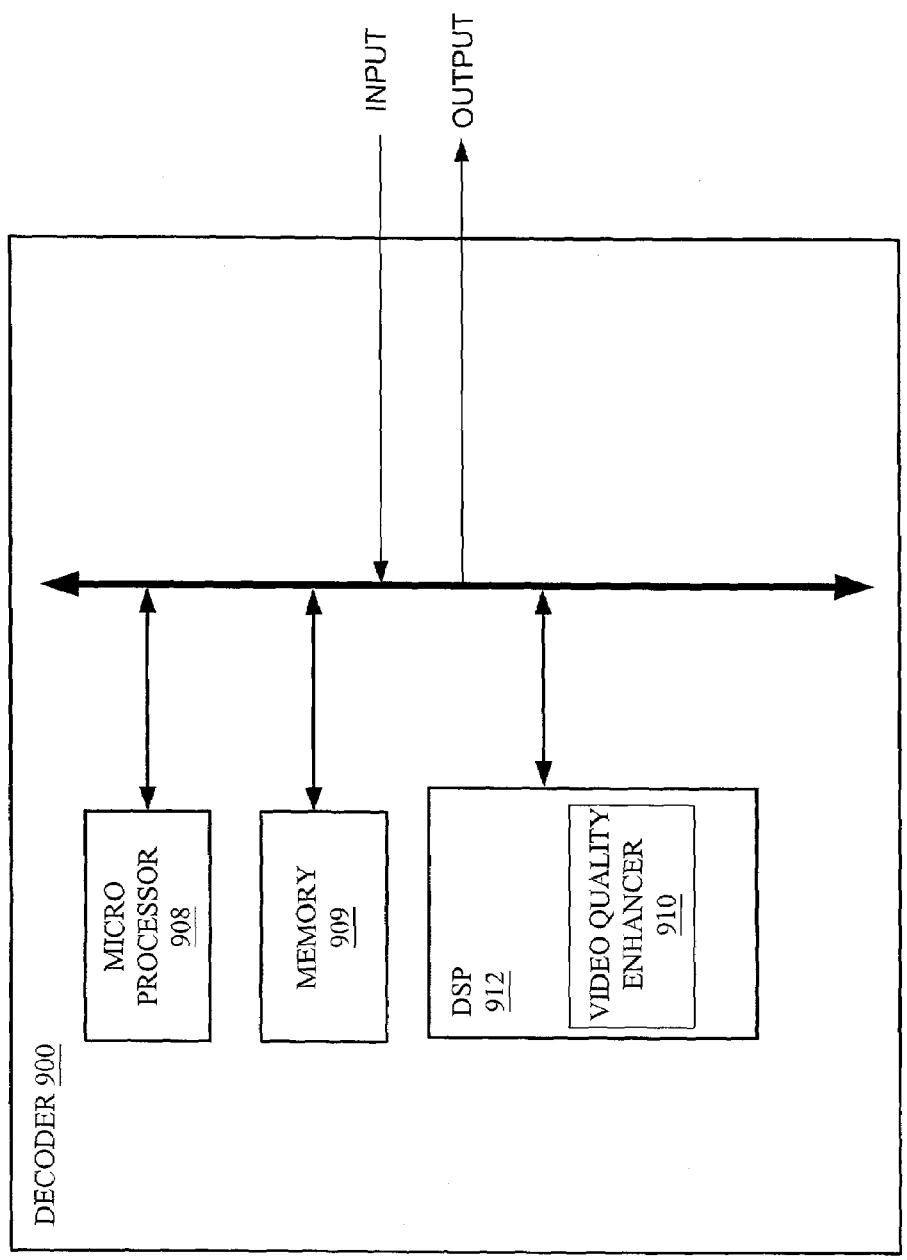
FIGS. 9A–9B are block diagrams that illustrate an example decoder that incorporates the preferred embodiments of the invention.
Figure 9B:
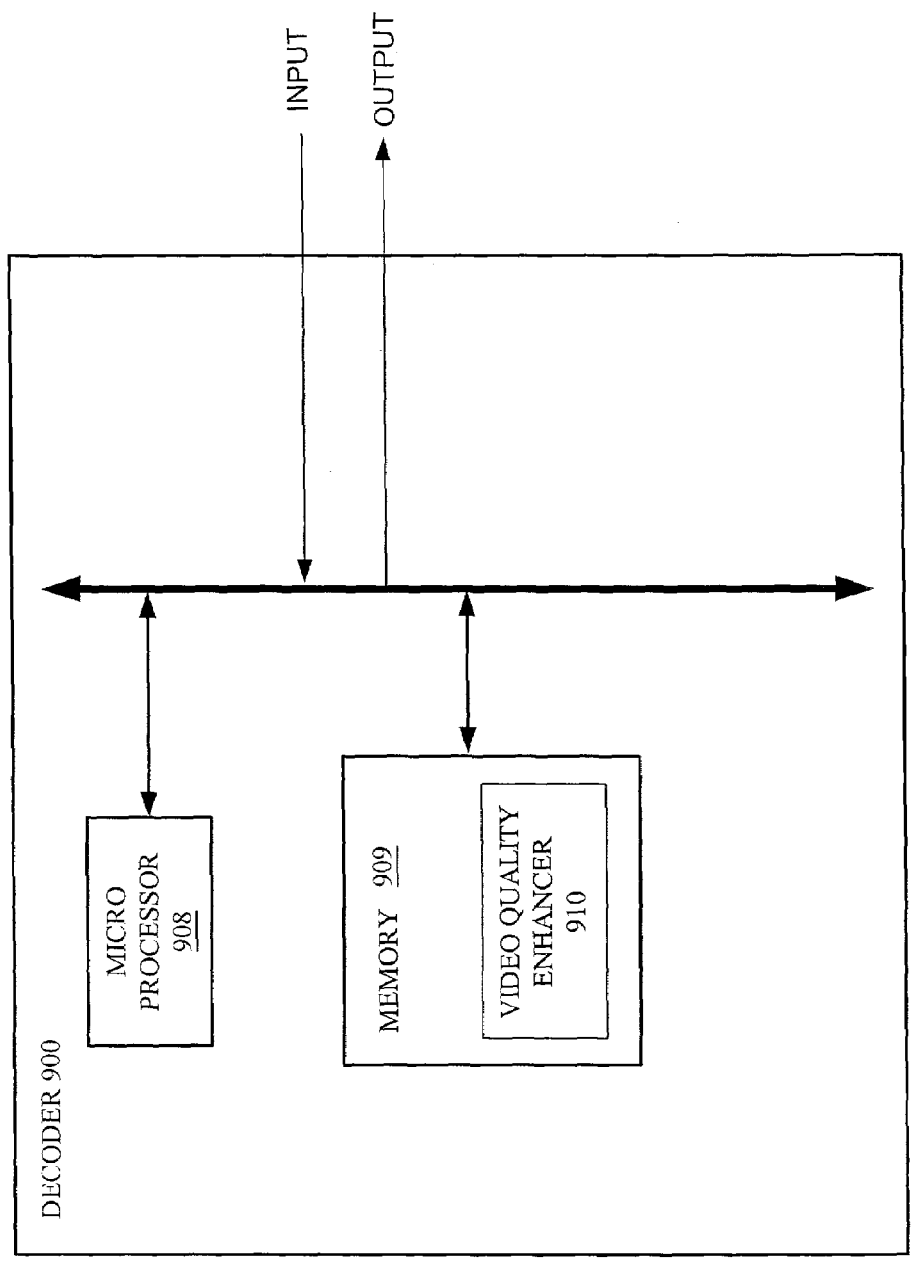

FIGS. 9A–9B are a block diagram illustrations of select components of an example decoder 900 that can incorporate the preferred embodiments of the invention. The scope of the present invention includes embodying the functionality of the preferred embodiments of the present invention in logic embodied in hardware or software-configured mediums. Although shown as integrated with a decoder, it will be appreciated by those having ordinary skill in the art that the preferred embodiments can be implemented in logic that is external to the decoder, yet in communication therewith. For purposes of illustration, the preferred embodiments will be entitled "video quality enhancer." FIG. 9A describes one embodiment, in which the video quality enhancer 910 is implemented as logic structured within a DSP 912. The DSP 912 can be custom made or a commercially available DSP, running the video quality enhancer 910 alone or in combination with the microprocessor 918. The microprocessor 928 is a hardware device for executing software, particularly that stored in memory 930. The microprocessor 928 can be any custom made or commercially available processor, a central processing unit (CPU), an auxiliary processor among several processors associated with the video quality enhancer 910, a semiconductor based microprocessor (in the form of a microchip or chip set), a macroprocessor, or generally any device for executing software instructions.

FIG. 9B describes another embodiment, wherein the video quality enhancer 910 is embodied as programming structure in memory 909, as will be described below. The memory 930 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 930 may incorporate electronic, magnetic, optical, and/or other types of storage media. Note that the memory 930 can have a distributed architecture, where various components are situated remote from one another, but can be accessed by the microprocessor 928.

In one implementation, the software in memory 930 can include video quality enhancer 910, which provides executable instructions for implementing the unitary matrix adaptations, as described above. The software in memory 930 may also include one or more separate programs, each of which comprises an ordered listing of executable instructions for implementing logical functions and operating system functions such as controlling the execution of other computer programs, providing scheduling, input-output control, file and data management, memory management, and communication control and related services.

When the decoder 900 is in operation, the microprocessor 928 is configured to execute software stored within the memory 930, to communicate data to and from the memory 930, and to generally control operations of the decoder 900 pursuant to the software.

When the video quality enhancer 910 is implemented in software, it should be noted that the video quality enhancer 910 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The video quality enhancer 910 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the video quality enhancer 910 is implemented in hardware, the video quality enhancer 910 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A superresolution method for generating a high resolution image solution from at least one low resolution image, the method comprising the steps of:
    estimating an image from at least one observed image to produce an estimated image, the observed image having a lower spatial resolution than the estimated image;
    simulating steps of an imaging process and compression process;
    simulating the effects of passing the estimated image through the simulated imaging process and compression process, the simulated effects producing simulated data;
    determining a difference between the simulated data and observed image data corresponding to the observed image; and updating the estimated image based on a product of a weight value and the difference if further optimization is needed, the weight value based on statistical quantization error information and statistical noise information, otherwise designating the estimated image as a solution.

2. The method of claim 1, further comprising the steps of:
    applying the simulated data and observed data of the observed image to an error function to minimize the error function, the error function minimization depending on the difference between the simulated data and the observed data, the error minimization further dependent on the likelihood of the estimated image, the likelihood favoring a smooth image solution.

3. The method of claim 2, wherein the step of estimating includes the step of interpolating at least one image by adding subsamples to the observed image.

4. The method of claim 2, further including the step of applying maximum a posteriori probability for superresolution of compressed video.

5. The method of claim 2, wherein minimization is complete if the error function, in response to the applying step, generates a value that is below a threshold value.

6. The method of claim 2, wherein minimization is complete if the error function, in response to the applying step, is subject to repeated iterations that exceed a predetermined number of iterations.

7. The method of claim 2, wherein minimization is complete if the amount of change due to the updating is less than a predetermined amount of change.

8. The method of claim 2, wherein the simulated data and the observed data include the coefficients of the estimated image and the observed image.

9. The method of claim 2, further including the step of repeating the simulating, the applying, and the updating steps until no further minimization of the error function is needed.

10. The method of claim 2, further including the step of reducing blocking artifacts.

11. The method of claim 2, wherein the steps of estimating, simulating, applying and updating are scalable with respect to at least one of bit-rate, frame-rate, image size, and video content.

12. A superresolution method for generating a high resolution image solution from at least one low resolution image, the method comprising the steps of:
    estimating an image from at least one observed image to produce an estimated image, the observed image having a lower spatial resolution than the estimated image;
    simulating steps of an imaging process and compression process;
    simulating the effects of passing the estimated image through the simulated imaging process and compression process, the simulated effects producing simulated data, and
    inverse transforming the simulated data and observed data of the observed image to obtain the simulated image and the observed image;
    applying the simulated image and the observed image to an error function to minimize the error function, the error function minimization depending on the difference between the simulated image and the observed image, the error minimization further dependent on the likelihood of the estimated image, the likelihood favoring a smooth image solution; and
    updating, based on the difference, the estimated image with inverse transformed statistical quantization error information and inverse transformed statistical noise information if further minimization is needed, otherwise designating the estimated image as a solution.

13. The method of claim 12, wherein the step of estimating includes the step of interpolating at least one image by adding subsamples to the observed image.

14. The method of claim 12, wherein the step of updating includes applying posteriori probability for superresolution of compressed video.

15. The method of claim 12, wherein minimization is complete if the error function, in response to the applying step, generates a value that is below a threshold value.

16. The method of claim 12, wherein minimization is complete if the error function, in response to the applying step, is subject to repeated iterations that exceed a predetermined number of iterations.

17. The method of claim 12, wherein minimization is complete if the amount of change due to the updating is less than a predetermined amount of change.

18. The method of claim 12, wherein the simulated data and the observed data includes the coefficients of the estimated image and the observed image.

19. The method of claim 12, further including the step of repeating the simulating, the applying, and the updating steps until no further minimization of the error function is needed.

20. The method of claim 12, further including the step of reducing blocking artifacts.

21. The method of claim 12, wherein the steps of estimating, simulating, inverse transforming, applying and updating are scalable with respect to at least one of bit-rate, frame-rate, image size, and video content.

22. A method for generating a high spatial and gray scale (bit) resolution image solution from at least one low spatial and bit resolution image, the method comprising the steps of:

estimating an image from at least one observed image to produce an estimated image, the observed image having at least one of a lower spatial and bit resolution than the estimated image;

simulating steps of an imaging and compression process;

simulating the effects of passing the estimated image through the simulated imaging and compression process, and scaling pixel intensities of the image that has been simulated as passing through the simulated imaging and compression process to produce a simulated image;

comparing the simulated image with the observed image; and backprojecting the difference between the simulated image and the observed image onto the estimated image in response to the difference exceeding a defined threshold, the backprojection applied to minimize the difference, otherwise designating the estimated image as the solution.

23. The method of claim 22, wherein the step of backprojecting includes the step of applying projection onto convex sets.

24. A method for generating a high spatial and bit resolution image solution from at least one low spatial and bit resolution image, the method comprising the steps of:

estimating an image from at least one observed image to produce an estimated image, the observed image having at least one of a lower spatial resolution and bit resolution than the estimated image;

simulating steps of an imaging process and compression process;

simulating the effects of passing the estimated image through the simulated imaging process;

scaling pixel intensities of the image that has been simulated as passing through the simulated imaging process, and simulating the effects of the compression process to produce a simulated image;

comparing the simulated image with the observed image; and backprojecting the difference between the simulated image and the observed image onto the estimated image in response to the difference exceeding a defined threshold, the backprojection applied to minimize the difference, otherwise designating the estimated image as the solution.

25. The method of claim 24, wherein the step of backprojecting includes the step of applying projection onto convex sets.

26. The method of claim 24, further including the step of reducing blocking artifacts.

27. The method of claim 24, wherein the steps of estimating simulating, comparing, scaling, and backprojecting are scalable with respect to at least one of bit-rate, frame-rate, image size, and video content.

28. A method for generating a high spatial and bit resolution image solution from at least one low spatial and bit resolution image, the method comprising the steps of:

estimating an image from at least one observed image to produce an estimated image, the observed image having at least one of a lower spatial and bit resolution than the estimated image;

simulating steps of an imaging and compression process;

simulating the effects of passing the bit estimated image through the simulated imaging and compression process, and scaling pixel intensities of the image that has been simulated as passing through the simulated, imaging and compression process to produce a simulated image;

applying the simulated image and the observed image to an error function to minimize the error function, the error function minimization depending on the difference between the simulated image and the observed image, the error minimization further dependent on the likelihood of the estimated image, the likelihood favoring a smooth image solution; and updating, based on the difference, the estimated image with statistical noise information if further minimization is needed, otherwise designating the estimated image as a solution.

29. The method of claim 28, wherein the step of estimating includes the step of interpolating at least one image by adding subsamples to the observed image.

30. The method of claim 28, wherein the step of updating includes applying posteriori probability.

31. The method of claim 28, wherein minimization is complete if the error function, in response to the applying step, generates a value that is below a threshold value.

32. The method of claim 28, wherein minimization is complete if the error function, in response to the applying step, is subject to repeated iterations that exceed a predetermined number of iterations.

33. The method of claim 28, wherein minimization is complete if the amount of change due to the updating is less than a predetermined amount of change.

34. The method of claim 28, further including the step of repeating the simulating, the applying, and the updating steps until no further minimization of the error function is needed.

35. The method of claim 28, wherein the step of updating improves the gray scale resolution and the spatial resolution of the estimated image.

36. The method of claim 28, further including the step of reducing blocking artifacts.

37. The method of claim 28, wherein the steps of estimating, simulating, applying, scaling, and updating are scalable with respect to at least one of bit-rate, frame-rate, image size, and video content.

38. A method for generating a high spatial and bit resolution image solution and improved spatial resolution from at least one low spatial and gray scale resolution image, the method comprising the steps of:

estimating an image from at least one observed image to produce an estimated image, the observed image having at least one of a lower spatial and bit resolution than the estimated image;

simulating steps of an imaging process and compression process;

simulating the effects of passing the estimated image through the simulated imaging and compression process;

scaling pixel intensities of the image that has been simulated as passing through the simulated imaging and compression process to produce simulated data;

applying the simulated data and the observed data of the observed image to an error function to minimize the error function, the error function minimization depending on the difference between the simulated data and the observed data, the error minimization further dependent on the likelihood of the estimated image, the likelihood favoring a smooth image solution; and updating, based on the difference, the estimated image with statistical quantization error information and statistical noise information if further minimization is needed, otherwise designating the estimated image as a solution.

39. The method of claim 38, wherein the step of estimating includes the step of interpolating at least one image by adding subsamples to the observed image.

40. The method of claim 38, wherein the step of updating includes applying posteriori probability.

41. The method of claim 38, wherein minimization is complete if the error function, in response to the applying step, generates a value that is below a threshold value.

42. The method of claim 38, wherein minimization is complete if the error function, in response to the applying step, is subject to repeated iterations that exceed a predetermined number of iterations.

43. The method of claim 38, wherein minimization is complete if the amount of change due to the updating is less than a predetermined amount of change.

44. The method of claim 38, wherein the simulated data and the observed data include the coefficients of the simulated image and the observed image.

45. The method of claim 38, further including the step of repeating the simulating, the applying, and the updating steps until no further minimization of the error function is needed.

46. The method of claim 38, wherein the step of updating improves the gray scale resolution and the spatial resolution of the estimated image.

47. The method of claim 38, further including the step of reducing blocking artifacts.

48. The method of claim 38, wherein the steps of estimating, simulating, scaling, applying and updating are scalable with respect to at least one of bit-rate, frame-rate, image size, and video content.

49. A superresolution method for generating a high resolution image solution from at least one low resolution image, the method comprising the steps of:

simulating the effects of passing an estimated image through a simulated imaging process and compression process, the simulated effects producing simulated data, and inverse transforming the simulated data and observed data of an observed image to obtain the simulated image and the observed image;

applying the simulated image and the observed image to an error function to minimize the error function, the error function minimization depending on the difference between the simulated image and the observed image, the error minimization further dependent on the likelihood of the estimated image, the likelihood favoring a smooth image solution; and updating, based on the difference, the estimated image with at least one of inverse transformed statistical quantization error information and inverse transformed deterministic information if further optimization is needed, otherwise designating the estimated image as a solution.

50. The method of claim 49, further including the steps of:

estimating an image from at least one observed image to produce an estimated image, the observed image having a lower spatial resolution than the estimated image;

updating the estimated image with inverse transformed statistical quantization error information and inverse transformed statistical noise information if further minimization is needed, otherwise designating the estimated image as a solution.

51. The method of claim 50, wherein the step of estimating includes the step of interpolating at least one image by adding subsamples to the observed image.

52. The method of claim 50, wherein the step of updating includes applying posteriori probability for superresolution of compressed video.

53. The method of claim 50, wherein minimization is complete if the error function, in response to the applying step, generates a value that is below a threshold value.

54. The method of claim 50, wherein minimization is complete if the error function, in response to the applying step, is subject to repeated iterations that exceed a predetermined number of iterations.

55. The method of claim 50, wherein minimization is complete if the amount of change due to the updating is less than a predetermined amount of change.

56. The method of claim 50, wherein the simulated data and the observed data includes the coefficients of the estimated image and the observed image.

57. The method of claim 50, further including the step of repeating the simulating, the applying, and the updating steps until no further minimization of the error function is needed.

58. A method for generating a high spatial and bit resolution image solution and improved spatial resolution from at least one one spatial and gray scale resolution image, the method comprising the steps of:

estimating an image from at least one observed image to produce an estimated image, the observed image having at least one of a lower spatial and bit resolution than the estimated image;

simulating steps of an imaging process and compression process;

simulating the effects of passing an estimated image through a simulated imaging process and compression process;

scaling pixel intensities of the image that has been simulated as passing through the simulated imaging and compression process to produce simulated data; and applying the simulated data and the observed data of the observed image to an error function to minimize the error function, the error function minimization depending on the difference between the simulated data and the observed data, the error minimization further dependent on the likelihood of the estimated image, the likelihood favoring a smooth image solution; and updating, based on the difference, the estimated image with statistical quantization error information and deterministic information if further minimization of an error function is needed, otherwise designating the estimated image as a solution.

59. A method for generating a high resolution image solution from at least one low resolution image, the method comprising the steps of:

estimating an image from at least one observed image to produce an estimated image, the observed image having a lower spatial resolution than the estimated image;

simulating steps of an image process and compression process;

simulating the effects of passing the estimated image through the simulated image process and compression process, the simulated effects producing simulated data;

applying the simulated data and observed data of the observed image to an error function to minimize the error function, the error function minimization depending on the difference between the simulated data and the observed data, the error minimization further dependent on the likelihood of the estimated image, the likelihood favoring a smooth image solution; and updating the estimated image with a value and the difference, the value based on statistical quantization error information and statistical noise information if further minimization is needed, otherwise designating the estimated image as a solution.

60. A superresolution system for generating a high resolution image solution from at least one low resolution image, the system comprising:

a processor configured with logic to estimate an image from at least one observed image to produce an estimated image, the observed image having a lower spatial resolution than the estimated image, wherein the processor is further configured with the logic to simulate steps of an imaging process and compression process, wherein the processor is further configured with the logic to simulate the effects of passing the estimated image through the simulated imaging process and compression process, the simulated effects producing simulated data, wherein the processor is further configured with the logic to apply the simulated data and observed data of the observed image to an error function to minimize the error function, the error function minimization depending on the difference between the simulated data and the observed data, the error minimization further dependent on the likelihood of the estimated image, the likelihood favoring a smooth image solution, wherein the processor is further configured with the logic to update the estimated image with a value and the difference, the value based on statistical quantization error information and statistical noise information if further optimization is needed, otherwise designating the estimated image as a solution.

61. The system of claim 60, wherein the processor is further configured with the logic to interpolate at least one image by adding subsamples to the observed image.

62. The system of claim 60, wherein the processor is further configured with the logic to apply maximum a posteriori probability for superresolution of compressed video.

63. The system of claim 60, wherein the processor is further configured with the logic to apply posteriori probability for superresolution of compressed video.

64. The system of claim 60, wherein the processor is further configured with the logic to complete minimization if the error function, in response to the application of the simulated and the observed image, generates a value that is below a threshold value.

65. The system of claim 60, wherein the simulated data and the observed data include the coefficients of the estimated image and the observed image.

66. The system of claim 60, wherein the processor is further configured with the logic to repeat the simulation, the application, and the update until no further minimization of the error function is needed.

67. The system of claim 60, wherein the processor is further configured with the logic to reduce blocking artifacts.

68. The system of claim 60, wherein the processor is further configured with the logic to estimate, simulate, apply, and update with scalability with respect to at least one of bit-rate, frame-rate, image size, and video content.

69. A superresolution system for generating a high resolution image solution from at least one low resolution image, the system comprising:

a processor configured with the logic to estimate an image from at least one observed image to produce an estimated image, the observed image having a lower spatial resolution than the estimated image, wherein the processor is further configured with the logic to simulate steps of an imaging process and compression process, wherein the processor is further configured with the logic to simulate the effects of passing the estimated image through the simulated imaging process and compression process, the simulated effects producing simulated data, wherein the processor is further configured with the logic to inverse transform the simulated data and observed data of the observed image to obtain the simulated image and the observed image, wherein the processor is further configured with the logic to apply the simulated image and the observed image to an error function to minimize the error function, the error function minimization depending on the difference between the simulated image and the observed image, the error minimization further dependent on the likelihood of the estimated image, the likelihood favoring a smooth image solution, wherein the processor is further configured with the logic to update, based on the difference, the estimated image with inverse transformed statistical quantization error information and inverse transformed statistical noise information if further minimization is needed, otherwise designating the estimated image as a solution.

70. The system of claim 69, wherein the processor is further configured with the logic to interpolate at least one image by adding subsamples to the observed image.

71. The system of claim 69, wherein the processor is further configured with the logic to apply posteriori probability for superresolution of compressed video.

72. The system of claim 69, wherein the processor is further configured with the logic to complete minimization if the error function, in response to the application of the simulated and the observed image, generates a value that is below a threshold value.

73. The system of claim 69, wherein the processor is further configured with the logic to complete minimization if the error function, in response to the application of the simulated and the observed image, generates a value that is below a threshold value.

74. The system of claim 69, wherein the processor is further configured with the logic to complete minimization if the amount of change due to the updating is less than a predetermined amount of change.

75. The system of claim 69, wherein the simulated data and the observed data includes the coefficients of the estimated image and the observed image.

76. The system of claim 69, wherein the processor is further configured with the logic to repeat the simulation, the application, and the updates until no further minimization of the error function is needed.

77. The system of claim 69, wherein the processor is further configured with the logic to reduce blocking artifacts.

78. The system of claim 69, wherein the processor is further configured with the logic to estimate, simulate, apply, inverse transform, and update with scalability with respect to at least one of bit-rate, frame-rate, image size, and video content.

79. A system for generating a high spatial and gray scale resolution image solution and improved spatial resolution from at least one one spatial and gray scale resolution image, the system comprising:
a processor configured with logic to estimate an image from at least one observed image to produce an estimated image, the observed image having at least one of a lower spatial and bit resolution than the estimated image, wherein the processor is further configured with the logic to simulate steps of an imaging process and compression process, wherein the processor is further configured with the logic to simulate the effects of passing the estimated image through the simulated imaging and compression process, wherein the processor is further configured with the logic to scale pixel intensities of the image that has been simulated as passing through the simulated imaging and compression process to produce simulated data, wherein the processor is further configured with the logic to apply the simulated data and the observed data of the observed image to an error function to minimize the error function, the error function minimization depending on the difference between the simulated data and the observed data, the error minimization further dependent on the likelihood of the estimated image, the likelihood favoring a smooth image solution, wherein the processor is further configured with the logic to update, based on the difference, the estimated image with statistical quantization error information and statistical noise information if further minimization is needed, otherwise designating the estimated image as a solution.

80. The system of claim 79, wherein the processor is further configured with the logic to interpolate at least one image by adding subsamples to the observed image.

81. The system of claim 79, wherein the processor is further configured with the logic to apply posteriori probability.

82. The system of claim 79, wherein the processor is further configured with the logic to complete minimization if the error function, in response to the application of the simulated and the observed image, generates a value that is below a threshold value.

83. The system of claim 79, wherein the processor is further configured with the logic to complete minimization if the error function, in response to the application of the simulated and the observed image, generates a value that is below a threshold value.

84. The system of claim 79, wherein the processor is further configured with the logic to complete minimization if the amount of change due to the updating is less than a predetermined amount of change.

85. The system of claim 79, wherein the simulated data and the observed data include the coefficients of the simulated image and the observed image.

86. The system of claim 79, wherein the processor is further configured with the logic to repeat the simulation, the application, and the updates until no further minimization of the error function is needed.

87. The system of claim 79, wherein the processor is further configured with the logic to update to improves the gray scale resolution and the spatial resolution of the estimated image.

88. The system of claim 79, wherein the processor is further configured with the logic to reduce blocking artifacts.

89. The system of claim 79, wherein the processor is further configured with the logic to estimate, simulate, apply, scale, and update with scalability with respect to at least one of bit-rate, frame-rate, image size, and video content.

* * * * *

UNITED STATES PATENT AND TRADEMARK OFFICE
CERTIFICATE OF CORRECTION

| | | |
|---|---|---|
| PATENT NO. | : 7,215,831 B2 | |
| APPLICATION NO. | : 10/133135 | |
| DATED | : May 8, 2007 | |
| INVENTOR(S) | : Altunbasak et al. | |

It is certified that error appears in the above-identified patent and that said Letters Patent is hereby corrected as shown below:

Col. 1, line 53, after "things," add --a--.
Col. 12, line 11, replace "corresponging" with --corresponding--.
Col. 13, line 9, replace "wither" with --either--.
Col. 15, line 50, after "pixel", delete "is".
Col. 17, line 22, after "to" delete "exp".
Col. 17, line 25, before the equation add --exp--.
Col. 18, line 26, replace "bit-dept" with --bit-depth--.
Col. 19, line 12, replace "bit-rate" with --bit-depth--.
Col. 23, line 38, before "bit-rate" add --include--.
Col. 23, line 43, after "are" delete "a".
Col. 23, line 59, replace "918" with --908--.
Col. 23, line 60, replace "928" with --908--.
Col. 23, line 61, replace "930" with --909--.
Col. 23, line 61, replace "928" with --908--.
Col. 24, line 4, replace "930" with --909--.
Col. 24, line 8, replace "930" with --909--.
Col. 24, line 10, replace "930" with --909--.
Col. 24, line 12, replace "928" with --908--.
Col. 24, line 13, replace "930" with --909--.
Col. 24, lines 14-16, delete ", which provides executable instructions for implementing the unitary matrix adaptations, as described above".
Col. 24, line 16, replace "930" with --909--.
Col. 24, line 25, replace "928" with --908--.
Col. 24, line 26, replace "930" with --909--.
Col. 24, line 27, replace "930" with --929--.
Col. 28, line 1, after "the" delete "bit".
Col. 29, line 65, after ";" add --and--.

UNITED STATES PATENT AND TRADEMARK OFFICE
CERTIFICATE OF CORRECTION

| | |
|---|---|
| PATENT NO. | : 7,215,831 B2 |
| APPLICATION NO. | : 10/133135 |
| DATED | : May 8, 2007 |
| INVENTOR(S) | : Altunbasak et al. |

It is certified that error appears in the above-identified patent and that said Letters Patent is hereby corrected as shown below:

Col. 34, line 27, replace "improves" with --improve--.

Signed and Sealed this

Eighteenth Day of September, 2007

JON W. DUDAS
*Director of the United States Patent and Trademark Office*